(12) United States Patent
Sumitani et al.

(10) Patent No.: US 6,751,716 B2
(45) Date of Patent: Jun. 15, 2004

(54) SEMICONDUCTOR STORAGE DEVICE, CONTROL DEVICE, AND ELECTRONIC APPARATUS

(75) Inventors: Ken Sumitani, Tenri (JP); Hidekazu Takata, Nara (JP); Yuji Tanaka, Nara (JP); Yasuyuki Aikawa, Nara (JP)

(73) Assignee: Sharp Kabushiki Kaisha, Abeno-ku (JP)

( * ) Notice: Subject to any disclaimer, the term of this patent is extended or adjusted under 35 U.S.C. 154(b) by 126 days.

(21) Appl. No.: 09/834,519

(22) Filed: Apr. 12, 2001

(65) Prior Publication Data
US 2002/0018384 A1 Feb. 14, 2002

(30) Foreign Application Priority Data
Apr. 21, 2000 (JP) ........................................ 2000-121844

(51) Int. Cl.7 ............................................... G06F 12/00
(52) U.S. Cl. ........................ 711/164; 711/163; 713/200; 713/202
(58) Field of Search ................................ 711/163, 164; 713/200, 202, 165, 166

(56) References Cited

U.S. PATENT DOCUMENTS

| 4,716,856 A | 1/1988 | Beisswenger et al. |
| 5,829,009 A | 10/1998 | Frazier |
| 6,330,648 B1 * | 12/2001 | Wambach et al. ........... 711/163 |
| 6,389,542 B1 * | 5/2002 | Flyntz ......................... 713/201 |
| 6,397,301 B1 * | 5/2002 | Quach et al. ................ 711/138 |

FOREIGN PATENT DOCUMENTS

| EP | 0 660 215 | 6/1995 |
| JP | 59-15299 | 8/1984 |
| JP | 63-225839 | 9/1988 |
| JP | 09-250929 | 9/1994 |
| WO | WO 00/42511 | 7/2000 |

* cited by examiner

Primary Examiner—Kimberly McLean-Mayo
(74) Attorney, Agent, or Firm—Morrison & Foerster LLP

(57) ABSTRACT

A semiconductor storage device including: a memory having a memory space, a plurality of addresses of the memory space each having data stored therein; and a security circuit for controlling a security function which activates or deactivates at least a part of the memory space according to whether, in the case where an address input to the security-circuit matches at least one key-address included in the security circuit, data stored in the address in the memory space is manipulated under a condition equal to a predetermined condition or under a condition not equal to the predetermined condition.

22 Claims, 15 Drawing Sheets

FIG.5A

WLSEC ─────────────────────────
WLR1 ─────────────────────────
WLR0 ─────────────────────────
WL255 ─────────────────────────
WL254 ─────────────────────────
    ┊           ┊
WL2 ─────────────────────────
WL1 ─────────────────────────
WL0 ─────────────────────────

FIG.5B

WLR1 ─────────────────────────
WLR0 ─────────────────────────
WL255 ─────────────────────────
WL254 ─────────────────────────
    ┊           ┊
WL2 ─────────────────────────
WL1 ─────────────────────────
WL0 ─────────────────────────

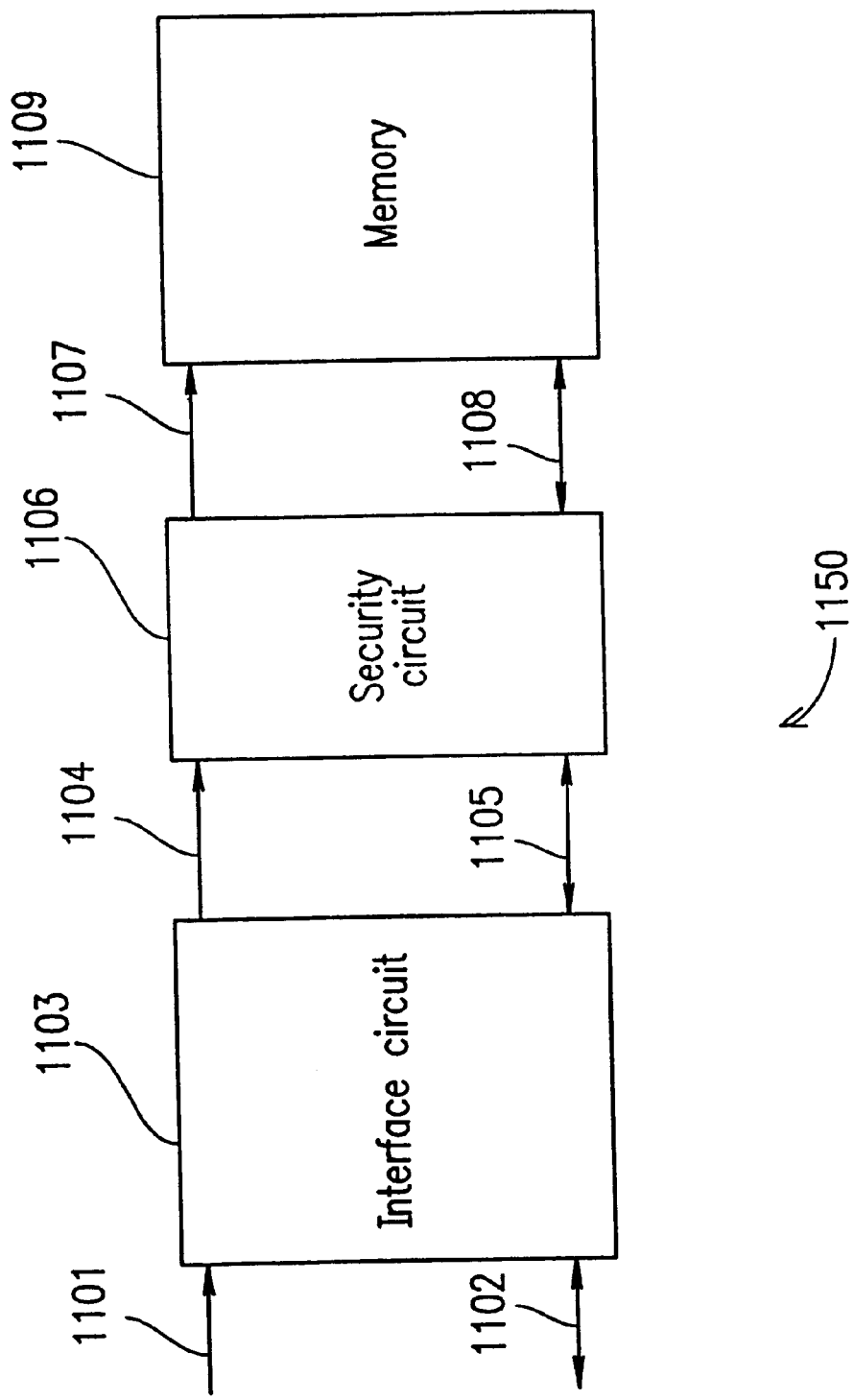
FIG. 13
Conventional

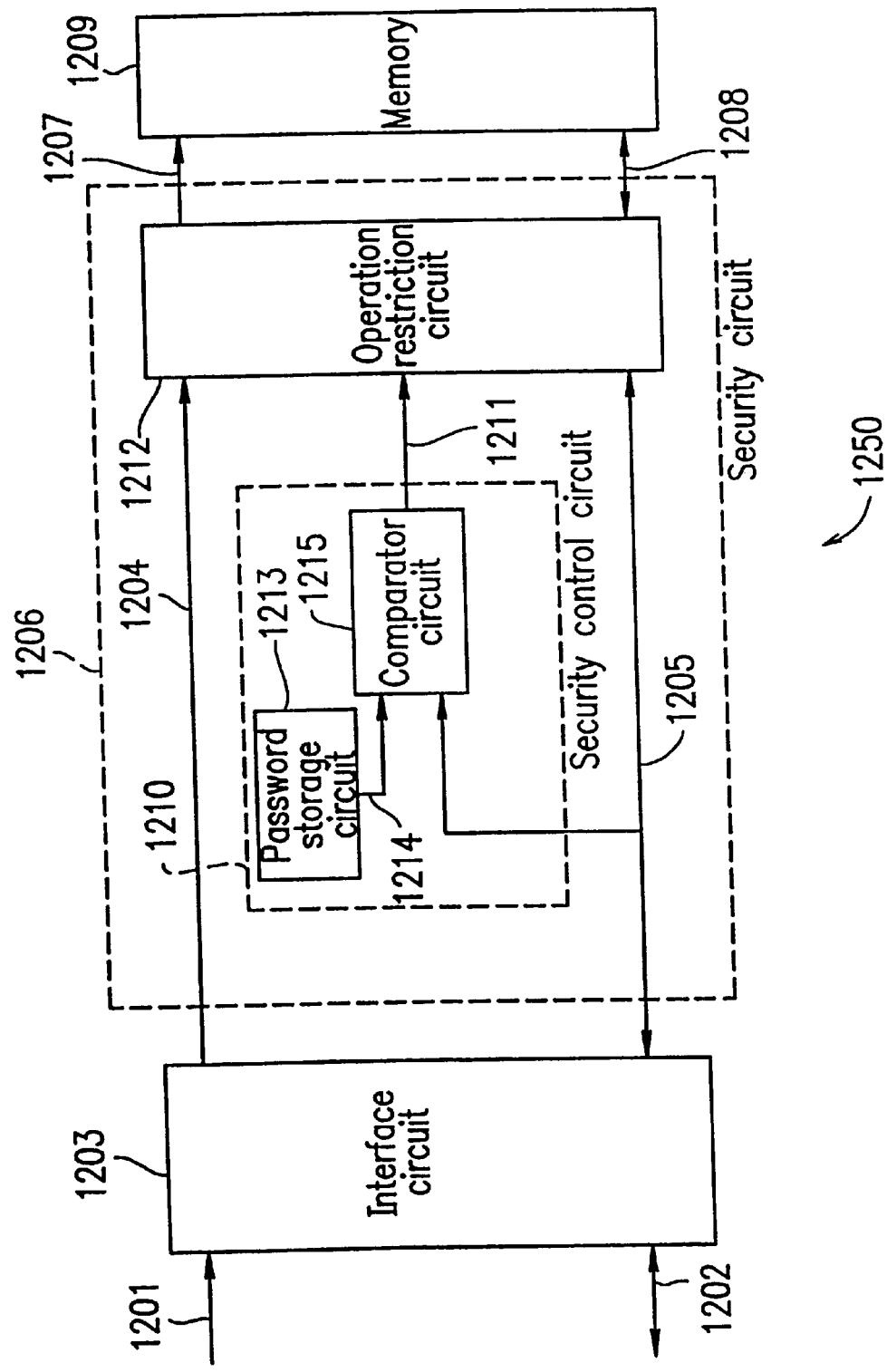
FIG. 14
Conventional

SEMICONDUCTOR STORAGE DEVICE, CONTROL DEVICE, AND ELECTRONIC APPARATUS

BACKGROUND OF THE INVENTION

1. Field of the Invention

The present invention relates to a semiconductor storage device in which fraudulent access and false access are surely prevented, a control device for the semiconductor storage device, and an electronic apparatus which uses the semiconductor storage device.

2. Description of the Related Art

Data stored in a semiconductor storage device may include data which should not be read out or rewritten by an unauthorized person, such as information associated with personal privacy, data protected by copyright, etc. Moreover, in a rewritable semiconductor storage device, such as an EEPROM, stored data may be falsely rewritten due to noises generated by an electronic apparatus or the semiconductor storage device itself, etc. For the purpose of protecting data stored in a memory from unexpected or undesirable access, some semiconductor storage devices and some control devices f or controlling semiconductor storage devices have security circuits incorporated therein.

Hereinafter, a semiconductor storage device having a conventional security function will be described with reference to FIGS. 13 and 14.

FIG. 13 is a block diagram showing a primary portion of a conventional semiconductor storage device 1150. The semiconductor storage device 1150 includes an interface circuit 1103 which communicates with outside, a memory 1109 having a memory space for storing data, and a security circuit 1106 interposed between the interface circuit 1103 and the memory 1109.

Now, a reading operation in the semiconductor storage device 1150 in which part of the memory space in the memory 1109 is deactivated by the security function is described.

The semiconductor storage device 1150 communicates with the outside through an input bus 1101 and a data input/output bus 1102 connected to the interface circuit 1103. Through the input bus 1101, an address for reading data stored in the memory 1109 and a control signal are supplied to the interface circuit 1103. The interface circuit 1103 analyzes a command input through the input bus 1101. When the command requests reading of data stored in the memory 1109, the interface circuit 1103 outputs through an address bus 1104 to the security circuit 1106 an address signal indicating an address in the memory 1109 from which data is to be read out.

The security circuit 1106 determines whether or not the address indicated by the address signal is included in an active memory space from which reading of data is permitted.

When the address indicated by the address signal is included in an active memory space from which reading of data is permitted, the security circuit 1106 supplies the address signal to the memory 1109 through an address bus 1107 according to the address data signal from the interface circuit 1103 and a security setting condition of the security circuit 1106. The memory 1109 reads out data stored in the address indicated by the address signal, and supplies the data to the security circuit 1106 through a data bus 1108. The security circuit 1106 supplies the data from the memory 1109 to the interface circuit 1103, and the interface circuit 1103 outputs the data to the outside through the input/output bus 1102.

In this way, the semiconductor storage device 1150 normally reads out data stored in the active memory space from which reading of data is permitted.

On the other hand, when an address indicated by the address signal from the interface circuit 1103 is included in an inactive memory space from which reading of data is prohibited, the security circuit 1106 makes any predetermined modification to the address signal, and supplies the modified address signal to the memory 1109 through the address bus 1107. Alternatively, the security circuit 1106 supplies an address indicated by the address signal from the interface circuit 1103 to the memory 1109, and receives data in the address from the memory 1109. Then, the security circuit 1106 makes any predetermined modification to the received data so that the received data is fixed as predetermined data, for example. Alternatively still, both of these modifications are made. By these modifications, the semiconductor storage device 1150 prevents normal reading of data stored in the inactive memory space from which reading of data is prohibited.

As described above, for the purpose of preventing data from being read out when the semiconductor storage device 1150 receives an address signal which commands the semiconductor storage device 1150 to read out data stored in an address in an inactive memory space from which reading of data is prohibited, data to be output is fixed to a predetermined value, for example. There are some other structures therefor where: the security circuit 1106 does not output the address signal to the memory 1109 (Japanese Laid-Open Publication No. 59-152599); the address signal supplied to the memory 1109 is disturbed (Japanese Laid-Open Publication No. 53-225839); data read out from the memory 1109 is disturbed and the disturbed data is output to the interface circuit 1103 through the data bus 1105 (Japanese Laid-Open Publication No. 6-250929).

According to these conventional techniques, any predetermined modification is made to an address signal or a signal transmitted through a data bus, whereby data stored in a memory space of a memory from which reading of data is prohibited is prevented from being normally read out from the memory.

In the example described hereinabove, reading of data is restricted by deactivating the memory space. However, deactivation of the memory space described in the present specification can be employed not only for restricting a reading operation but also for restricting a rewriting operation, restricting a special function allocated to a predetermined address, and restricting some of these operations and functions simultaneously. In either case, restriction is achieved, as in the case of restricting reading of data, by making any predetermined modification to a control signal on an address bus, by making any predetermined modification to data on a data bus, or by making any predetermined modification to other control signals. With such a modification, an active memory space and an inactive memory space are operated in a different manner, i.e., normal operation is performed for an active memory space, and normal operation is hindered for an inactive memory space.

Now, another example of a security function is described with reference to FIG. 14. FIG. 14 shows a conventional semiconductor storage device 1250 including an interface circuit 1203, a security circuit 1206, and a memory 1209. In this semiconductor storage device 1250, a security function is activated at power-on, by inputting a reset signal, etc., and deactivated by inputting a predetermined password inherently given to the semiconductor storage device 1250.

The security circuit 1206 shown in FIG. 14 includes a security control circuit 1210, an operation restriction circuit 1212 for restricting a security function by an output of the security control circuit 1210. The security control circuit 1210 includes a password storage circuit 1213 and a comparator circuit 1215 for comparing a password supplied from the interface circuit 1203 to the security circuit 1206 with a password stored in the password storage circuit 1213.

When an externally provided address signal commands the semiconductor storage device 1250 to read out data stored in the memory 1209, the same operation as in the semiconductor storage device 1150 is performed. That is, when the address signal indicates an address within a memory space from which reading of data is prohibited, the operation restriction circuit 1212 in the security circuit 1206 makes any predetermined modification to the address signal received from the interface circuit 1203 through an address bus 1204, and the modified address signal is output to the memory 1209 through an address bus 1207. Alternatively, the operation restriction circuit 1212 in the security circuit 1206 makes any predetermined modification to data read out from the memory 1209, and the modified data is output to the interface circuit 1203 through a data bus 1205. Alternatively still, both of these modifications (the modification to the address signal and the modification to the read out data) are made by the security circuit 1206. In the case where the address indicated by the address signal is within a memory space from which reading of data is permitted, these modifications are not made, i.e., the security function is not activated.

When the operation restriction circuit 1212 in the security circuit 1206 receives from the comparator circuit 1215 through a data bus 1211 a match signal indicating a match between a password from the interface circuit 1203 and a password from the password storage circuit 1213, the operation restriction circuit 1212 cancels the above modifications.

After the interface circuit 1203 receives a password input command from outside the semiconductor storage device 1250 through an input bus 1201 or an input/output bus 1202, the interface circuit 1203 receives a password from outside through the input/output bus 1202. The interface circuit 1203 outputs the received password to the comparator circuit 1215 through the data bus 1205. The comparator circuit 1215 compares the password from the interface circuit 1203 (i.e., originally from the outside) with the password which is stored in the password storage circuit 1213. When the passwords are matched, the comparator circuit 1215 generates and outputs a match signal to the operation restriction circuit 1212. In response to the match signal, the operation restriction circuit 1212 cancels the modification to the address signal and/or the modification to the data signal. As a result, the security function is deactivated, and therefore, it is possible to normally read out data within a memory space from which reading of data was prohibited.

According to this conventional technique, in order to freely use the semiconductor storage device 1250, a person who wants to use the semiconductor storage device 1250 needs to know the password stored in the password storage circuit 1213 and how to input the password. As long as these are kept secret from unauthorized people, fraudulent reading of data by an unauthorized person can be prevented.

Furthermore, at least a part of the functions of the semiconductor storage device 1250 are restricted until the device 1250 receives a correct password. Thus, the possibility of false rewriting, etc., decreases.

However, conventional security control methods require inputting a password inherent to a semiconductor device by stationary input means, such as a keyboard, etc., in order to control the security function. Therefore, through analyzing an input bus, the conditions for deactivating the security function may be revealed.

Furthermore, according to the conventional security control methods, when a security function for preventing fraudulent reading of data from a semiconductor storage device is deactivated by an unauthorized person, and all the data stored in a memory is read out, a counterfeit of such a semiconductor storage device may be easily produced. In such a case, in order to prevent use of data stored in the counterfeit product, it is necessary to provide an identification apparatus for identifying the counterfeit product.

SUMMARY OF THE INVENTION

According to one aspect of the present invention, a semiconductor storage device includes: a memory having a memory space, a plurality of addresses of the memory space each having data stored therein; and a security circuit for controlling a security function which activates or deactivates at least a part of the memory space according to whether, in the case where an address input to the security circuit matches at least one key-address included in the security circuit, data stored in the address in the memory space is manipulated under a condition equal to a predetermined condition or under a condition not equal to the predetermined condition.

In one embodiment of the present invention, a plurality of addresses are input to the security circuit, the security circuit including a plurality of key-addresses set in a predetermined order; and the predetermined condition is that the predetermined order of the key-addresses is equal to an order of manipulation for data stored in addresses among the plurality of addresses which match the key-addresses.

In another embodiment of the present invention, when data in an address among the plurality of addresses which does not match any of the key-addresses is manipulated, the security circuit does not determine whether or not an manipulation order for the address which does not match any of the key-addresses is consistent with a predetermined order of the key-addresses.

In still another embodiment of the present invention, when the order of manipulation for data stored in the plurality of addresses does not match the predetermined order of the key-addresses, the security circuit cancels a previously determined match between the predetermined order of the key-addresses and an order of the plurality of addresses.

In still another embodiment of the present invention, when the order of manipulation for data stored in the plurality of addresses matches the predetermined order of the key-addresses except that data in one of the addresses matched with any of the key-addresses is repetitively manipulated, the security circuit determines that these orders match each other.

In still another embodiment of the present invention, a match determination between the address and the key-address is performed only with respect to a portion of the address.

In still another embodiment of the present invention, some or all of the key-addresses are rewritable.

In still another embodiment of the present invention, the at least one key-address is stored in the memory.

In still another embodiment of the present invention, the at least one key-address is stored in the memory; and the memory has a redundant memory structure including at least one address for storing the key-address.

In still another embodiment of the present invention, the at least one key-address is stored in the memory; and the memory has a redundant memory structure including at least one address for storing the key-address in which an address in the memory for storing data for the key-address can be used for storing data for an address in the memory which is different from the key-addresses.

In still another embodiment of the present invention, the predetermined condition is changed by satisfying the predetermined condition.

In still another embodiment of the present invention, addresses in the memory space to be activated/deactivated are changed by satisfying the predetermined condition.

In still another embodiment of the present invention, the security circuit includes a security state output section for outputting a signal indicating a state of a security function.

According to another aspect of the present invention, a control device for controlling a semiconductor storage device has a memory space, in which a security function of the semiconductor storage device is controlled such that at least a part of the memory space is activated/deactivated, wherein the security function of the semiconductor storage device is controlled according to whether, in the case where an address input from the control device matches at least one key-address stored in the semiconductor storage device, data stored in the address in the memory space of the semiconductor storage device is manipulated under a condition equal to a predetermined condition or under a condition not equal to the predetermined condition.

In one embodiment of the present invention, the control device inputs a plurality of addresses into the semiconductor storage device, the semiconductor storage device having a plurality of key-addresses set in a predetermined order; and the predetermined condition is that the predetermined order of the key-addresses is equal to an order of manipulation for data stored in addresses among the plurality of addresses which match the key-addresses.

In another embodiment of the present invention, when data in an address among the plurality of addresses which does not match any of the key-addresses is manipulated, the semiconductor storage device does not determine whether or not an manipulation order for the address which does not match any of the key-addresses is consistent with a predetermined order of the key-addresses.

In still another embodiment of the present invention, when the order of manipulation for data stored in the plurality of addresses does not match the predetermined order of the key-addresses, the semiconductor storage device cancels a previously determined match between the predetermined order of the key-addresses and an order of the plurality of addresses.

In still another embodiment of the present invention, when the order of manipulation for data stored in the plurality of addresses matches the predetermined order of the key-addresses except that data in one of the addresses matched with any of the key-addresses is repetitively manipulated, the semiconductor storage device determines that these orders match each other.

In still another embodiment of the present invention, a match determination between the address and the key-address is performed only with respect to part of the address.

In still another embodiment of the present invention, some or all of the key-addresses are rewritable.

In still another embodiment of the present invention, the predetermined condition is changed by satisfying the predetermined condition.

In still another embodiment of the present invention, addresses in the memory space to be activated/deactivated are changed by satisfying the predetermined condition.

According to still another aspect of the present invention, an electronic apparatus includes: a semiconductor storage device having a memory space; and a semiconductor storage device for controlling a security function which activates/deactivates at least a part of the memory space, wherein the control device reads a state of the security function of the semiconductor storage device after the security function of the semiconductor storage device has been controlled.

In one embodiment of the present invention, the semiconductor storage device outputs authentic data when data is output from an active memory space, and outputs dummy data which is different from the authentic data when data is output from an inactive memory space; and in response to the dummy data from the semiconductor storage device, the control device deactivates the security function of the semiconductor storage device.

In another embodiment of the present invention, the security function of the semiconductor storage device is deactivated by satisfying a plurality of conditions.

Thus, the invention described herein makes possible the advantages of (1) providing a semiconductor storage device having an excellent security function in which normal operation is utilized for controlling the security function, and in which it is difficult for an unauthorized person to analyze the security function so as to know a mechanism thereof, and (2) providing an electronic apparatus which utilizes a security function to identify whether a semiconductor storage device used with the electronic apparatus is an authentic product or a counterfeit product, and to perform different operations for the authentic product and the counterfeit product.

These and other advantages of the present invention will become apparent to those skilled in the art upon reading and understanding the following detailed description with reference to the accompanying figures.

BRIEF DESCRIPTION OF THE DRAWINGS

FIGS. 5A and 5B each illustrate a row line structure in the semiconductor storage device according to the present invention.

FIG. 13 is a block diagram showing an example of a conventional semiconductor storage device.

FIG. 14 is a block diagram showing another example of a conventional semiconductor storage device.

DESCRIPTION OF THE PREFERRED EMBODIMENTS

Hereinafter, embodiments of the present invention will be described with reference to the drawings.
(Embodiment 1)

Figure 1:
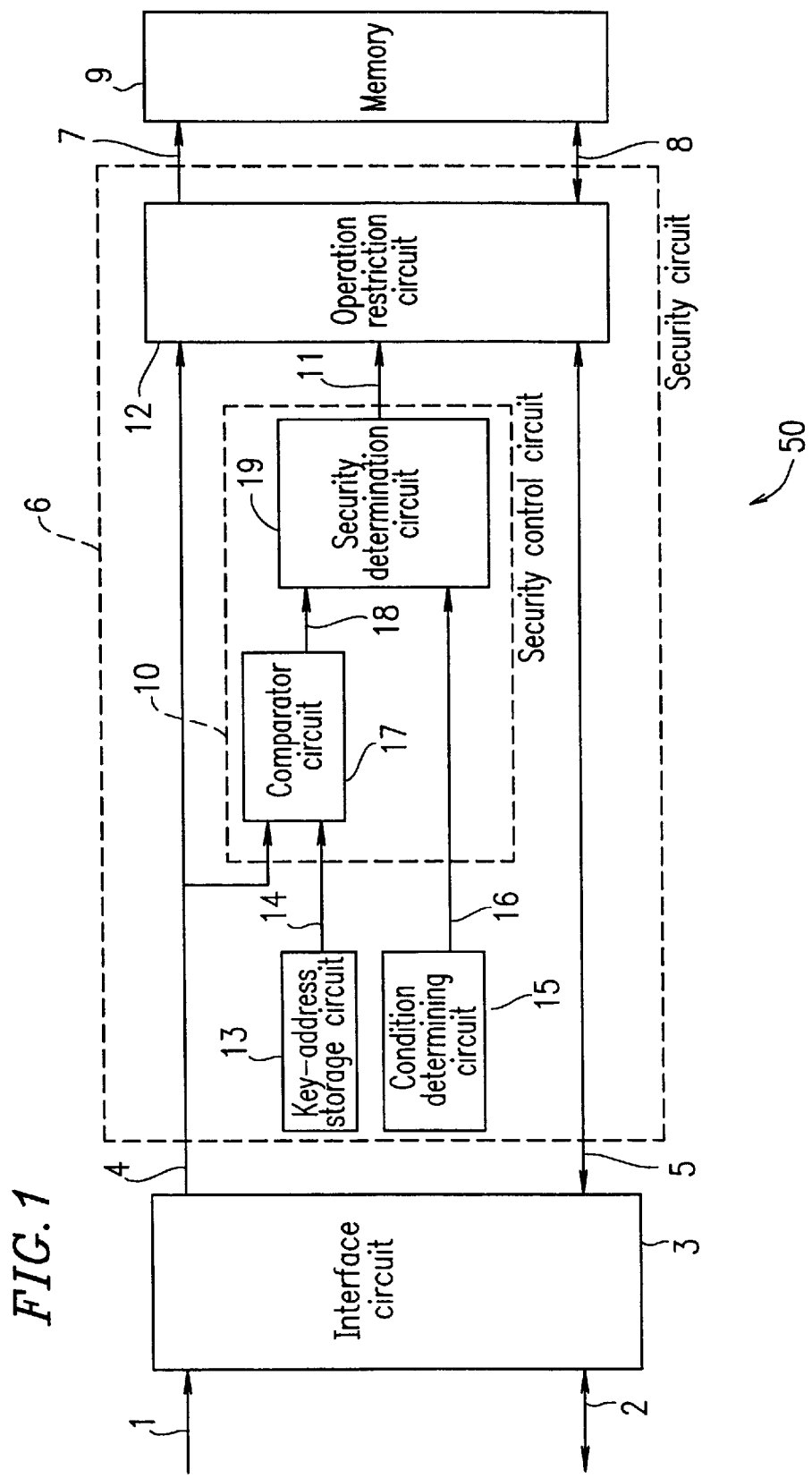
FIG. 1 is a block diagram showing an example of a semiconductor storage device according to the present invention.

FIG. 1 is a block diagram showing a primary portion of a semiconductor storage device 50 according to embodiment 1 of the present invention. The semiconductor storage device 50 includes an interface circuit 3 which communicates with outside, a memory 9 having a memory space for storing data, and a security circuit 6 interposed between the interface circuit 3 and the memory 9. The security circuit 6 includes a security control circuit 10, an operation restriction circuit 12, a key-address storage circuit 13, and a condition determining circuit 15. The security control circuit 10 controls, i.e., activates/deactivates, a security function for protecting data stored in a memory space according to whether or not reading of data from the memory space is prohibited. The operation restriction circuit 12 restricts the security function according to an output of the security control circuit 10.

The security control circuit 10 includes a comparator circuit 17 and a security determination circuit 19. The comparator circuit 17 compares a key-address from the key-address storage circuit 13 with an address contained in an address signal from the interface circuit 3.

The key-address stored in the key-address storage circuit 13 is used to control (activate/deactivate) the security function. According to a structure of the present invention, whether or not the security function is controlled (activated/deactivated) is determined according to whether data stored in a "specific" address in the memory space is manipulated under a condition equal to any predetermined condition or under a condition not equal to the predetermined condition. In other words, control of the security function for data stored in the memory space depends on whether data stored in a "specific" address in the memory space is manipulated under a condition equal to any predetermined condition or under a condition not equal to the predetermined condition. In the present specification, the "specific address" is referred to as a "key-address".

The security control circuit 10 also receives an output of the condition determining circuit 15. In the condition determining circuit 15, a condition for activating the security function is predetermined. The condition determining circuit 15 generates a key-address waiting signal according to whether data stored in an address matched with one of the key-addresses is manipulated under a condition equal to the predetermined condition or under a condition not equal to the predetermined condition and outputs the key-address waiting signal to the security determination circuit 19 through a data bus 16.

The control of the security function includes activation of the security function and deactivation of the security function. First, a case where in the semiconductor storage device 50 having the above structure, manipulating data stored in a specific address in a memory space which corresponds to a key-address stored in the key-address storage circuit 13 is utilized as a condition for activating the security function is described. In this example, initially, the security function for the memory space is inactive. When the data stored in the specific address in the memory space which corresponds to the key-address is manipulated under a condition not equal to a predetermined condition, the condition determining circuit 15 generates a key-address waiting signal. On the other hand, when the data stored in the specific address in the memory space which corresponds to the key-address is manipulated under a condition equal to the predetermined condition, the condition determining circuit 15 does not generate a key-address waiting signal. In the present specification, "activation of the security function" means deactivating at least a portion of the memory space.

The interface circuit 3 receives an input signal through an input bus 1, generates an address signal based on the input signal, and outputs the address signal through an address bus 4. A data input/output bus 5 is provided between the interface circuit 3 and the security circuit 6. The comparator circuit 17 in the security control circuit 10 receives the address signal from the interface circuit 3 and the key-address from the key-address storage circuit 13 through a data bus 14. When an address contained in the address signal matches the key-address, the comparator circuit 17 generates a match signal and outputs the match signal to the security determination circuit 19 through a data bus 18.

When the data stored in the specific key-address in the memory space which corresponds to the key-address is manipulated under a condition not equal to a predetermined condition, the condition determining circuit 15 generates a key-address waiting signal and outputs the key-address waiting signal to the security determination circuit 19 through the data bus 16. When the security determination circuit 19 receives the key-address waiting signal from the condition determining circuit 15 and a match signal from the comparator circuit 17 while at least a portion of the memory space in the memory 9 is active, the security function is activated by the operation restriction circuit 12, whereby at least a portion of the active portion of the memory space in the memory 9 is deactivated.

Next, a case where manipulating data stored in a specific address in a memory space which corresponds to a key-address stored in the key-address storage circuit 13 is utilized as a condition for deactivating the security function is described. In this example, initially, the security function for the memory space is active. When the data stored in the specific address in the memory space which corresponds to the key-address is manipulated under a condition equal to a predetermined condition, the condition determining circuit 15 generates a key-address waiting signal. On the other hand, when the data stored in the specific address in the memory space which corresponds to the key-address is manipulated under a condition not equal to the predetermined condition, the condition determining circuit 15 does not generate a key-address waiting signal. In the present specification, "deactivation of the security function" means activating at least a portion of the memory space.

The interface circuit 3 receives an input signal through the input bus 1, generates an address signal based on the input signal, and outputs the address signal through the address bus 4. Between the interface circuit 3 and the security circuit 6, data is transferred through the data input/output bus 5. The comparator circuit 17 in the security control circuit 10 receives the address signal from the interface circuit 3 and the key-address from the key-address storage circuit 13 through the data bus 14. When an address contained in the address signal matches the key-address, the comparator circuit 17 generates a match signal and outputs the match signal to the security determination circuit 19 through the data bus 18.

When the data stored in the specific address in the memory space which corresponds to the key-address is manipulated under a condition equal to a predetermined condition, the condition determining circuit 15 generates a key-address waiting signal and outputs the key-address waiting signal to the security determination circuit 19 through the data bus 16. When the security determination circuit 19 receives a key-address waiting signal from the condition determining circuit 15 and a match signal from the comparator circuit 17 while at least a portion of the memory space in the memory 9 is inactive, the security function is deactivated by the operation restriction circuit 12, whereby at least a portion of the inactive portion of the memory space in the memory 9 is activated.

Figure 2:
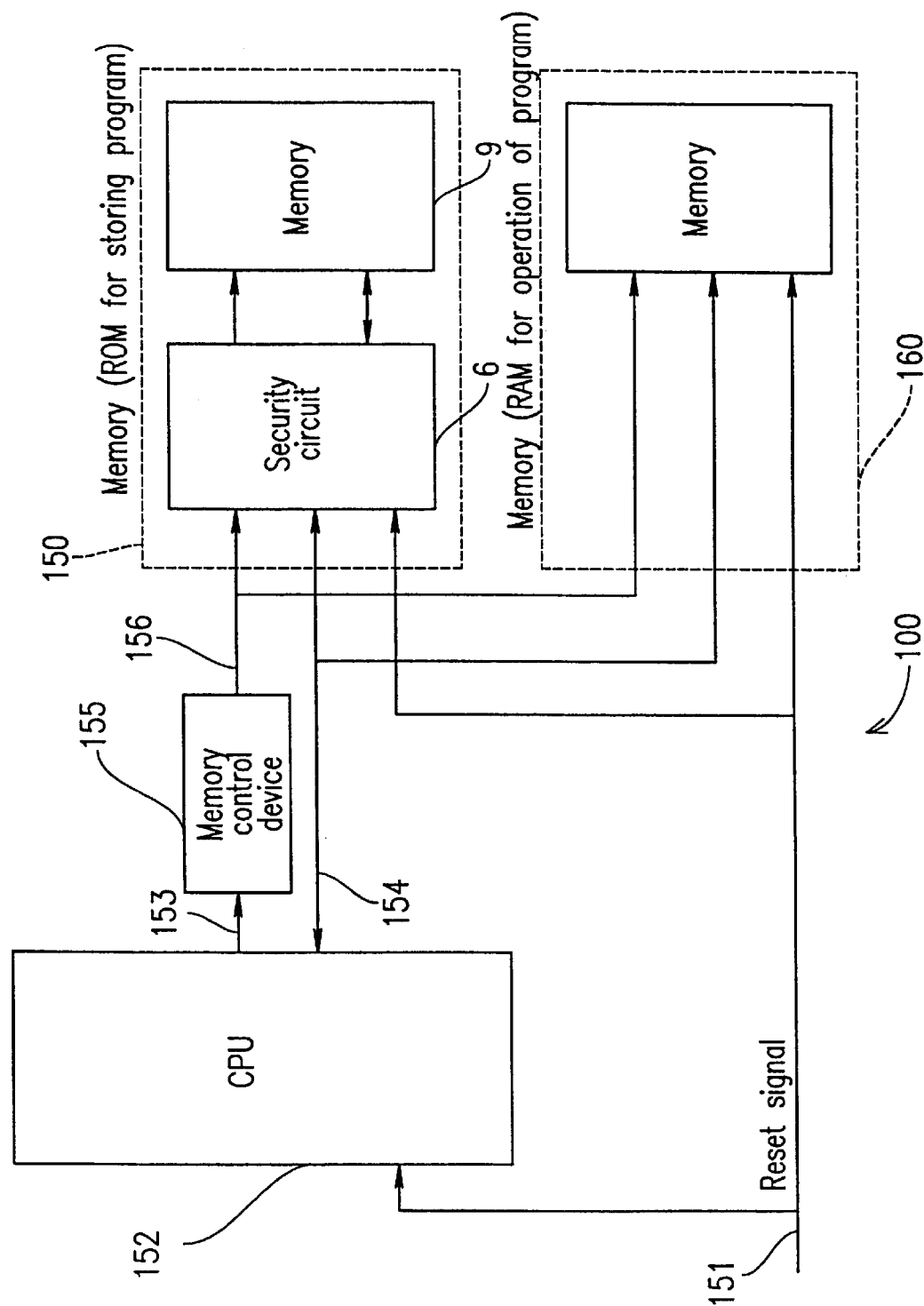
FIG. 2 is a block diagram showing an electronic apparatus including the semiconductor storage device shown in FIG. 1.

FIG. 2 shows an electronic apparatus 100 incorporating a semiconductor storage device 150 according to the present invention. FIG. 2 is a block diagram for illustrating the security function of the present invention. The security function of the present invention is not limited to the electronic apparatus 100 shown in FIG. 2, but is applicable to other electronic apparatuses. The semiconductor storage device 150 has substantially the same structure as the semiconductor storage device 50, and therefore, detailed descriptions of the semiconductor storage device 150 are herein omitted.

The electronic apparatus 100 includes a CPU 152, a memory control device 155, the semiconductor storage device 150 according to the present invention, and another semiconductor storage device 160. The semiconductor storage devices 150 and 160 are controlled by the CPU 152 and the memory control device 155. The semiconductor storage device 150 is, for example, a ROM for storing programs, and the CPU 152 only reads data from the semiconductor storage device 150. The security circuit 6 and the memory 9 in the semiconductor storage device 150 have substantially the same structure as those in the semiconductor storage device 50 shown in FIG. 1. The semiconductor storage device 150 includes a security circuit 6 and a memory 9, and a security circuit 6 activates/deactivates a security function for protecting data stored in the memory 9 from fraudulent access by an unauthorized person.

The semiconductor storage device 160 is a RAM which is used during the operation of programs, and does not have a security function.

When the CPU 152 reads data from the semiconductor storage device 150, or when the CPU 152 reads data from or writes data into the semiconductor storage device 160, a control signal supplied from the CPU 152 through a bus 153 provides an operation order (e.g., reading or writing of data) to the memory control device 155, and based on the provided operation order, the memory control device 155 outputs through a bus 156 a signal for controlling the semiconductor storage device 150 or the semiconductor storage device 160. Between the CPU 152 and the semiconductor storage device 150 or the semiconductor storage device 160, data is directly or indirectly transmitted through a data bus 154.

In the electronic apparatus 100, as shown in Table 1(a), a memory space is represented by 16 bits ("h" means that the address is represented by a hexadecimal number), and can be divided into addresses "0000h" to "FFFFh". The memory space can be allocated to a plurality of semiconductor storage devices. For example, among these addresses, addresses "0000h" to "EFFFh" are allocated to the semiconductor storage device 150. When the CPU 152 requests reading of data stored in any of these addresses, data stored in the semiconductor storage device 150 is read out. Addresses "F000h" to "FFFFh" are allocated to the semiconductor storage device 160. When the CPU 152 requests reading of data from any of these addresses or writing of data into any of these addresses, data stored in the semiconductor storage device 160 is read out or data is written into the semiconductor storage device 160.

In this example of a semiconductor storage device 150 having a security function, it is assumed that when the security function is active, data stored in addresses "8000h" to "EFFFh" in the memory 9 cannot be normally read out; and data stored in addresses "0000h" to "7FFFh" are normally read out regardless of whether the security function is active or inactive.

TABLE 1(a)

| Order | Address |
|---|---|
| 1 | 0000h |
| 2 | 0001h |
| 3 | 0002h |
| 4 | 0003h |
| 5 | 00F0h |
| 6 | 00F1h |
| 7 | 00F2h |
| 8 | 00F3h |
| 9 | 1000h |
| 10 | 1001h |
| 11 | 00F4h |
| 12 | 00F5h |
| 13 | 00F0h |
| 14 | 00F1h |
| 15 | 00F2h |
| 16 | 00F3h |
| 17 | 1000h |
| 18 | 1001h |
| 19 | 00F4h |
| 20 | 00F5h |
| 21 | 00F6h |
| 22 | 00F7h |
| 23 | 00F8h |
| 24 | 00F9h |
| 25 | 00FAh |
| 26 | 00FBh |
| 27 | 8000h |
| 28 | 8001h |
| 29 | F000h |
| 30 | F001h |
| 31 | 00FCh |
| 32 | 00FDh |
| 33 | 00FEh |
| 34 | 00FFh |
| . | . |
| . | . |
| . | . |

The addressing order after the 34th address is indefinite and changes according to the running state of a program.

TABLE 1(b)

| Order | Address |
|---|---|
| 1 | 0000h |
| 2 | 0001h |

TABLE 1(b)-continued

| Order | Address |
|---|---|
| 3 | 0002h |
| 4 | 0003h |
| 5 | 0004h |
| 6 | 0005h |
| 7 | 0006h |
| 8 | 0007h |
| 9 | 0008h |
| 10 | 0009h |
| 11 | 000Ah |
| 12 | 000Bh |
| 13 | 000Ch |
| 14 | 000Dh |
| 15 | 000Eh |
| 16 | 000Fh |
| 17 | 0010h |
| 18 | 0011h |
| 19 | 0012h |
| 20 | 0013h |
| 21 | 0014h |
| 22 | 0015h |
| 23 | 0016h |
| 24 | 0017h |
| 25 | 0018h |
| 26 | 0019h |
| 27 | 001Ah |
| 28 | 001Bh |
| 29 | 001Ch |
| 30 | 001Dh |
| 31 | 001Eh |
| 32 | 001Fh |
| 33 | 0020h |
| 34 | 0021h |
| . | . |
| . | . |
| . | . |

Addresses after the 34$^{th}$ addresses are manipulated similarly according to the incremental order.

The CPU 152 is reset by a reset signal supplied through a bus 151. Thereafter, the CPU 152 starts a program sequentially from address "0000h".

In general, a program code is carried out from the lower address, and therefore, data stored in the semiconductor storage device 150 and the semiconductor storage device 160 are sequentially read out from the lower address. However, since an actual program includes branching, referencing, subroutine calls, etc., data in some addresses are read out discontinuously. For example, referring to Table 1(a), according to the present invention, after the CPU 152 is reset by a reset signal, the order of addresses from which data are read out is fixed until the 34th address, and the order of addresses after the 34th address may change according to situation. The order of addresses shown in Table 1(a) is merely an example for describing the present invention, and is not necessarily an exemplary order of addresses used for an actual electronic apparatus. On the other hand, when an unauthorized person attempts to fraudulently read data, for the purpose of reading out all of the data from the memory, data is generally read out according to the incremental order as shown in Table 1(b).

Next, a case where manipulating data stored in an address corresponding to the key-address is utilized as a condition for activating the security function is described.

For simplicity of description, it is herein assumed that the security function of the semiconductor storage device 150 is deactivated in response to a reset signal supplied through a data bus 151. However, such a structure is not practical because in such a structure, data can be read out from any address by inputting a reset signal immediately before accessing the address. This is merely for simplifying the description of the present invention.

When data stored in addresses in an active memory space (in which the security function is inactive) are manipulated according not to the order shown in Table 1(b) but to the order shown in Table 1(a), as seen from Table 1(a), it is only after data stored in address "00F4h" has been manipulated twice (11h and 19th addresses) that data stored in an address corresponding to a key-address "00FAh" (25th address) is manipulated. In this example, this rule is employed as a condition for activating the security function, and address "00FAh" is assigned as a key-address. Furthermore, a counter circuit is provided for counting the number of times that the data stored in address "00F4h" has been manipulated in the condition determining circuit 15 of the semiconductor storage device 150 (see FIG. 1).

In this example, if data stored in an address corresponding to the key-address ("00FAh") is manipulated while the counted number of times for address "00F4h" is not 2, i.e., data stored in an address corresponding to the key-address ("00FAh") is manipulated under a condition not equal to the above condition, the condition determining circuit 15 generates a key-address waiting signal. For example, if a reading operation is performed according to the order shown in Table 1(b), i.e., data stored in an address corresponding to the key-address ("00FAh") is manipulated while the number of times that data stored in address "00F4h" has been manipulated is not 2, the comparator circuit 17 generates a match signal 18 while all of the memory space is active. In this case, the security determination circuit 19 receives both the key-address waiting signal and the match signal 18, and accordingly, the security function is activated. As a result, addresses "8000h" to "EFFFh" are deactivated, whereby reading of data from these addresses is restricted. On the other hand, if data is read out according to the order of addresses shown in Table 1(a), data in key-address "00FAh" is manipulated after data in address "00F4h" has been manipulated twice. This situation is equal to the above condition for activating the security function. Therefore, the condition determining circuit 15 does not generate a key-address waiting signal, and accordingly, the security function is not activated.

Thus, according to the above method for activating the security function, when data stored in addresses is manipulated according to the order shown in Table 1(a), which satisfies the predetermined condition, a normal reading operation from the memory space cannot be interrupted. On the other hand, in a fraudulent reading operation in which data stored in addresses is manipulated according to, for example, the order shown in Table 1(b), which does not satisfy the predetermined condition, data stored in an address corresponding to the key-address ("00FAh") is manipulated while the number of times that data stored in address "00F4h" has been manipulated is 1. Thus, in response to the manipulation of data stored in an address corresponding to the key-address "00FAh", the security function is activated. Accordingly, addresses from the 27th address "8000h" are deactivated, and data stored in addresses "8000h" to "EFFFh" cannot be normally read out.

Note that, in this example, if the data stored in address "00FAh" assigned as the key-address is manipulated after the 34th address, the security function may be activated at an undesirable time during the reading operation, and accordingly, a normal reading operation may be interrupted. However, the above example is merely an example for describing the idea of the present invention, i.e., the present invention is not limited to the above example.

Besides deactivation of the security function by a reset signal, the security function may be deactivated by power-on. Alternatively, a command or password may be provided as a condition for deactivating the security function, and the security function may be deactivated by externally inputting the command or password. In this case, a user can deactivate the security function before manipulating data stored in an inactive portion of the memory space. Thereafter, when data stored in an address corresponding to a key-address is manipulated according to an accessing order not equal to an authentic accessing order, it is not recognized as being an authentic access, and therefore, the security function is activated. Accordingly, at least a portion of the memory space is again deactivated.

Next, a case where manipulating data stored in an address corresponding to the key-address is utilized as a condition for deactivating the security function is described. In this example, it is assumed that the security function of the semiconductor storage device 150 is activated in response to a reset signal supplied through the data bus 151. As a result, data stored in addresses "8000h" to "EFFFh" cannot be normally read out until a condition for deactivating the security function is satisfied.

In this example, the above-employed rule, "it is only after data stored in address "00F4h" has been manipulated twice (11h and 19th addresses) that data stored in an address "00FAh" (25th address) is manipulated", is employed as a condition for deactivating the security function, and address "00FAh" is assigned as a key-address. Furthermore, a counter circuit is provided for counting the number of times that the data stored in address "00F4h" has been manipulated in the condition determining circuit 15 of the semiconductor storage device 150. In this example, only when data stored in an address corresponding to the key-address ("00FAh") is manipulated while the counted number of times for address "00F4h" is 2, i.e., data stored in an address corresponding to the key-address ("00FAh") is manipulated under a condition equal to the above condition, the condition determining circuit 15 generates a key-address waiting signal. Thus, the security function is deactivated when data stored in an address corresponding to the key-address ("00FAh") is manipulated while the above condition is satisfied.

For example, if a reading operation is performed according to the order shown in Table 1(a), data in the key-address "00FAh" is manipulated after data in address "00F4h" has been manipulated twice. This situation is equal to the above condition for deactivating the security function. Therefore, the condition determining circuit 15 generates a key-address waiting signal. At the same time, a match signal has been generated by the comparator circuit 17 while addresses "8000h" to "EFFFh" are inactive. As a result, the security function is deactivated, i.e., addresses "8000h" to "EFFFh" are activated. In this way, the restriction on a reading operation from these addresses is removed. On the other hand, if a reading operation is performed according to the order shown in Table 1(b), data stored in an address corresponding to the key-address ("00FAh") is manipulated while the number of times that data stored in address "00F4h" has been manipulated is 1 (i.e., not 2). This is not equal to the above condition for deactivating the security function. Thus, the security function is not deactivated, i.e., the restriction on the reading operation from addresses "8000h" to "EFFFh" is not removed.

Thus, according to the above method for deactivating the security function, when data stored in addresses are manipulated according to the order shown in Table 1(a), which satisfies the predetermined condition, the security function can be deactivated before manipulating data stored in addresses "8000h" to "EFFFh". As a result, a normal reading operation from these addresses can be normally performed. On the other hand, in a fraudulent reading operation in which data stored in addresses is manipulated according to, for example, the order shown in Table 1(b), which does not satisfy the predetermined condition, data stored in an address corresponding to the key-address ("00FAh") is manipulated while the number of times that the data stored in address "00F4h" has been manipulated is 1. Thus, the security function is not deactivated before manipulating data stored in addresses "8000h" to "EFFFh". Accordingly, data stored in addresses "8000h" to "EFFFh" cannot be normally read out.

The method for activating the security function and the method for deactivating the security function can be simultaneously employed in a single semiconductor storage device. Of course, one of these methods can be solely employed. Furthermore, circuit size and security strength required for controlling the security function can be adjusted by appropriately simplifying or complicating a condition for controlling (activating/deactivating) the security function.

Furthermore, a condition for controlling (activating/deactivating) the security function is not limited to the above example utilizing addresses from which data has already been read out. Besides such a method, there are various possible methods: a method which utilizes an address in which data has been rewritten or rewritten data; a method which controls the security function by externally inputting a signal such as a method which utilizes a password system as shown in the related art, a method which utilizes a timing of inputting a password, etc.; and combinations thereof.

As described hereinabove, according to the present invention, the security function can be activated/deactivated by a combination of a key-address and a predetermined condition. Therefore, the control for the security function can be achieved on the basis of a normal operation, such as reading of data, writing of data, etc., without performing a special operation for activating/deactivating the security function. In such a structure based on a normal operation, it is difficult for an unauthorized person to analyze a condition for activating/deactivating the security function so as to know a mechanism thereof. Furthermore, a key-address, a specific condition, etc., used for activating/deactivating the security function can be determined after a program has been completed. Therefore, it is not necessary to insert a code for controlling the security function into the program. Thus, in designing a program, it is not necessary to consider the security function, that is, the security function does not substantially influence the design of the program.

Now, consider a structure in which the above-described condition for deactivating the security function is employed; the security function is activated only when a device is powered-on and when a reset signal is input; the security function is always active in the initial state; and while a program is running, the security function is never again activated after the security function has been deactivated once. In this structure, after the security function is deactivated once before accessing an inactive memory space from which reading of data is prohibited, a user can thereafter select a program content without considering the security function. Thus, verification after the completion of a program is easily conducted.

As described in embodiment 1 of the present invention, in the case where manipulating data stored in an address corresponding to a key-address under a specific condition can be used as a condition for deactivating the security function. In such a case, when at least a portion of a memory space is active while the security function is active, processing for deactivating the security function is carried out in the active portion of the memory space, whereby the security function can be deactivated while a program is running.

Furthermore, in the case where a rewritable device is used as storage means for storing a key-address, an address utilized for establishing a condition for controlling the security function, etc., even when a program is changed, the present invention can be adapted upon such a change of the program.

There is related art directed to the same objective (control of the security function) as the present invention. Japanese Laid-Open Publication No. 1-173244 discloses a technique in which output data is modified when an accessing order among addresses is different from a predetermined accessing order. This related art technique does not include the concept of activation/deactivation of the memory space, and thus, the nature thereof is essentially different from that of the present invention. However, according to this related art technique, as in the present invention, fraudulent reading can be prevented, and the security system can be activated when data stored in a specific address is manipulated.

For example, consider a case where this related art method is employed in the semiconductor storage device 50 of the electronic apparatus 100 in which an accessing order shown in Table 1(a) is used as a normal accessing order, and when data stored in an address other than the 27th address "8000h" is read out immediately after data in the 26th address "00FBh" has been read out, any predetermined modification is made to data to be output, thereby preventing data from being normally output. However, such a structure may cause malfunction when data in the 26th address "00FBh" is manipulated in different processing, for example, when data in the 5th address "00F0h" to the 35th address "00Ffh" (including data in the 26th address "00FBh") are transferred to another portion of the memory space. Therefore, in some programs, an address which restricts an access thereto after the completion of the program necessarily needs to be checked as to whether or not data stored in the address is read out in another addressing order. Such a check step imposes a restriction on creation of the program.

As a result, considerable time is required for creating the program. As described above in embodiment 1, the present invention is free from such disadvantages.

(Embodiment 2)

One of the features of embodiment 2 is deactivating the security function by comparing a plurality of key-addresses and a plurality of selected addresses in which data is to be manipulated, and when the respective key-addresses match the respective address, verifying whether or not a manipulation order of addresses is equal to an order of key-addresses.

Figure 3A:
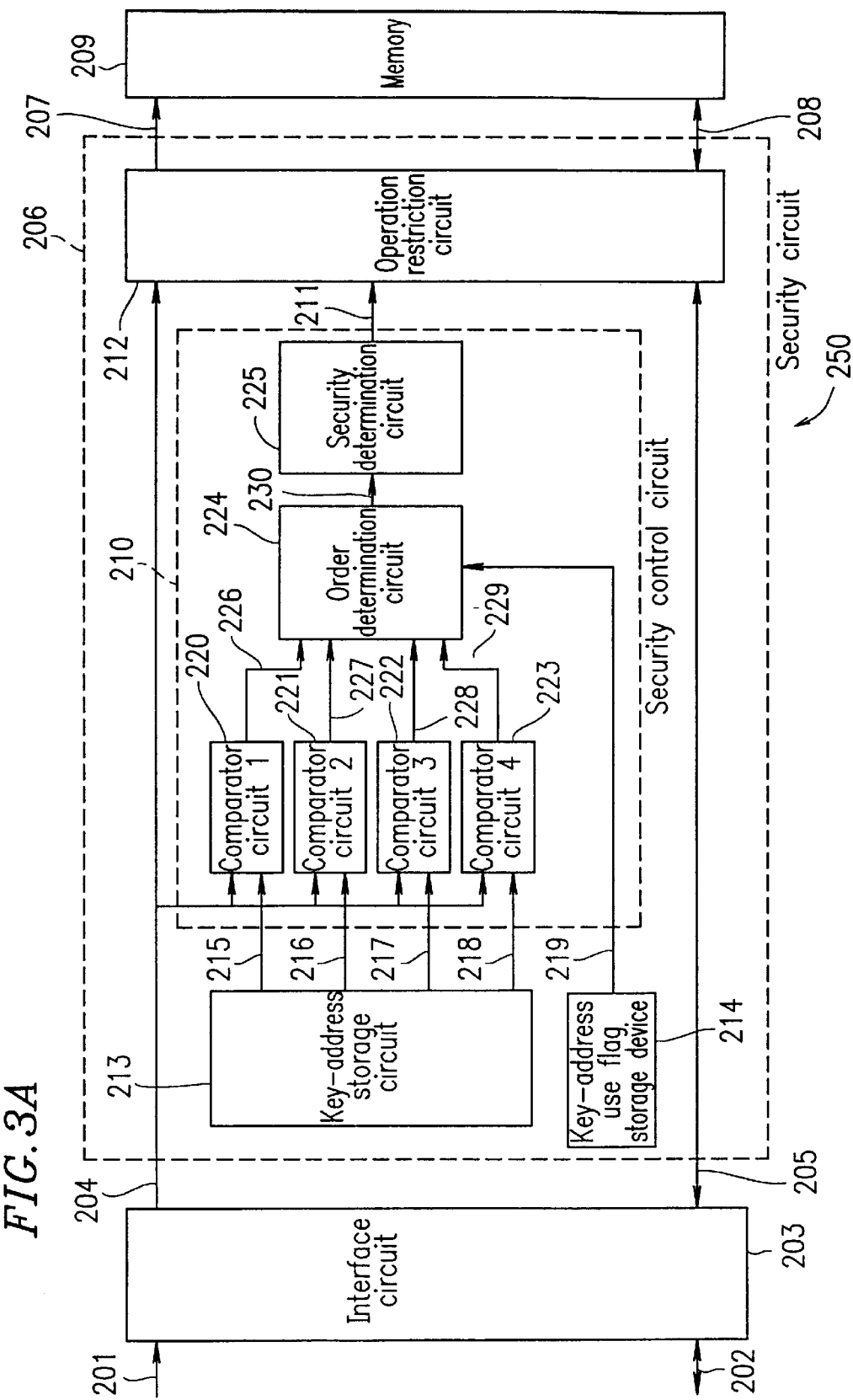
FIG. 3A is a block diagram showing another example of a semiconductor storage device according to the present invention.

FIG. 3A is a block diagram showing a semiconductor storage device 250 according to embodiment 2 of the present invention.

The semiconductor storage device 250 of FIG. 3A includes an interface circuit 203, a security circuit 206, and a memory 209 having a memory space. The security circuit 206 includes a security control circuit 210, an operation restriction circuit 212, a key-address storage circuit 213, a key-address use flag storage device 214. The security control circuit 210 includes four comparator circuits 220–223, an order determination circuit 224, and a security determination circuit 225.

For example, when the interface circuit 203 is commanded to manipulate data stored in four addresses through an input bus 201 and/or a data bus 202, the interface circuit 203 transmits the assigned four addresses to the security control circuit 210 through the address bus 204. The four comparator circuits 220–223 compare the four addresses from the interface circuit 203 and four key-addresses 1–4 respectively input from the key-address storage circuit 213 through key-address buses 215–218. When the four addresses from the interface circuit 203 match key-addresses 1–4 from the key-address storage circuit 213, respectively, each of the comparator circuits 220–223 generate a match signal and output the match signal to the order determination circuit 224 through respective data buses 226–229.

The order determination circuit 224 determines a generation order of the match signals. When this generation order perfectly matches a predetermined order, the order determination circuit 224 outputs a completion signal to the security determination circuit 225 through a data bus 230. The security determination circuit 225 outputs through a data bus 211 a signal for deactivating the security function, whereby at least a part of a restriction imposed on operations by the operation restriction circuit 212 is deactivated.

The semiconductor storage device 250 having such a structure can be used in the electronic apparatus 100 shown in FIG. 2 in place of the semiconductor storage device 150. Now, an operation of the electronic apparatus 100 including the semiconductor storage device 250 is described.

In embodiment 2, a structure of the electronic apparatus 100 is the same as that in embodiment 1 except that the semiconductor storage device 250 is used in place of the semiconductor storage device 150. Furthermore, the semiconductor storage device 250 uses a reset operation performed by a reset signal input through a data bus 151 as one of the conditions for activating the security function. When a reset signal is generated, the security function is activated, whereby data stored in addresses "8000h" to "EFFFh" cannot be normally read out.

According to a program stored in the semiconductor storage device 250, an addressing order after the reset operation has been completed is an order of Table 1(a). That is, the order is fixed until the 34th address, and an addressing order after the 34th address changes according to situation.

[Tables 2]

TABLE 2(a)

| Key-address 1 | 1000h |
| Key-address 2 | 1001h |
| Key-address 3 | 00F4h |
| Key-address 4 | 00F5h |

Predetermined order:
Key-address 1, Key-address 2, Key-address 3, Key-address 4

TABLE 2(b)

| Key-address 1 | 0000h |
| Key-address 2 | 1000h |
| Key-address 3 | 00F4h |
| Key-address 4 | 00F5h |

Predetermined order:
Key-address 1, Key-address 2, Key-address 3, Key-address 4

TABLE 2(c)

| Key-address 1 | 0000h |
| Key-address 2 | 1000h |
| Key-address 3 | 00FAh |
| Key-address 4 | 00FBh |

Predetermined order:
Key-address 1, Key-address 2, Key-address 3, Key-address 4

TABLE 2(d)

| Key-address 1 | F3h |
|---|---|
| Key-address 2 | 00h |
| Key-address 3 | 01h |
| Key-address 4 | F4h |

Predetermined order:
Key-address 1, Key-address 2, Key-address 3, Key-address 4

When it is determined that data is manipulated according to the order shown in Table 1(a), for example, as shown in Table 2(a), the 9th and 17th addresses "1000h" are assigned as key-address 1, the 10th and 18th addresses "1001h" are assigned as key-address 2, the 11th and 19th addresses "00F4h" are assigned as key-address 3, and the 12th and 20th addresses "00F5h" are assigned as key-address 4. The comparator circuits 220, 221, 222, and 223 receive the key-addresses "1000h", "1001h", "00F4h", and "00F5h", respectively. It is predetermined that the order determination circuit 224 receives the match signals in the order from the match signal derived from key-address 1, the match signal derived from key-address 2, the match signal derived from key-address 3, and the match signal derived from key-address 4. Now, an operation for deactivating the security function of the semiconductor storage device 250 is described.

When data in the memory space is manipulated in the order shown in Table 1(a), each of the 1st address to the 8th address does not match any of the key-addresses 1–4. Therefore, the security function is maintained to be active. The 9th address "1000h" matches key-address 1. Since address "1000h" received through the address bus 204 matches key-address 1 received through the key-address bus 215, the comparator circuit 220 outputs a match signal to the order determination circuit 224 through the data bus 226. In response to manipulation of the first key-address, key-address 1, the order determination circuit 224 recognizes that this order matches the predetermined order.

Next, the 10th address "1001h" is manipulated. Since address "1001h" matches key-address 2, the comparator circuit 221 outputs to the order determination circuit 224 through the data bus 227 a match signal indicating the match between address "101h" and key-address 2. The order determination circuit 224 receives the match signal derived from key-address 2 subsequent to the match signal derived from key-address 1, and thus recognizes that data in key-address 2, address "1001h", have been manipulated according to the predetermined order.

Then, the 11th address "00F4h" is manipulated. Since address "00F4h" matches key-address 3, the comparator circuit 222 outputs to the order determination circuit 224 through the data bus 228 a match signal indicating the match between address "00F4h" and key-address 3. The order determination circuit 224 receives the match signal derived from key-address 3 subsequent to the match signal derived from key-address 2, and thus recognizes that data in key-address 3, address "00F4h", have been manipulated according to the predetermined order.

Then, the 12th address "00F5h" is output from the interface circuit 203 through the address bus 204. Since address "00F5h" matches key-address 4, the comparator circuit 223 outputs to the order determination circuit 224 through the data bus 229 a match signal indicating the match between address "00F5h" and key-address 4. In response to the receipt of the match signal derived from key-address 4, the order determination circuit 224 supplies to the security determination circuit 225 through the data bus 230 a completion signal informing that data in the 12th address has been manipulated according to the predetermined order. In response to the completion signal, the security determination circuit 225 recognizes that the condition for deactivating the security function has been satisfied, and removes the restriction against reading of data from addresses "8000h" to "EFFFh" through the data bus 211.

In the semiconductor storage device 250 which operates in such a manner, when an unauthorized person tries to fraudulently read data, for the purpose of reading out all of the data from the memory, data is generally read out according to the incremental order from the lowest address as shown in Table 1(b). In such a case, a manipulation order of addresses does not match the predetermined order of the key-addresses.

The present invention is not limited to the above number of key-addresses. However, when a smaller number of key-addresses are used, the risk of fraudulent reading by an unauthorized person increases. On the other hand, when a greater number of key-addresses are used, determination of the order of key-addresses may be complicated according to program content. For the purpose of avoiding such a problem, the semiconductor storage device 250 includes the key-address use flag storage circuit 214 as shown in FIG. 3A. The key-address use flag storage circuit 214 stores a key-address use flag signal in which whether or not each of the key-addresses is used is defined. The key-address use flag storage circuit 214 outputs the key-address use flag signal to the order determination circuit 224. According to the definition in the key-address use flag signal, the order determination circuit 224 can omit determining the order of key-addresses which have been defined as "not used".

In such a structure, any number of key-addresses which are anticipated to be necessary is provided. When it is too complicated to select key-addresses among these key-addresses, information that an unnecessary address is put into disuse is stored in the key-address use flag storage circuit 214, whereby the number of key-addresses to be used can be reduced. Furthermore, even in the case where an address once used as a key-address becomes unusable as a key-address after a change has been made to a program, it is possible to cope with such a change of a program by only modifying a key-address use flag. Moreover, by putting some or all of the key-addresses into disuse using a key-address use flag, it is possible to reduce manipulations for deactivating the security function when a test or evaluation for a semiconductor chip is performed.

Furthermore, in the electronic apparatus 100 including the semiconductor storage device 250, a method for deactivating the security function can be variously modified by changing a determination method of the order determination circuit 224. Hereinafter, one of an effective determination method is described.

In this example, it is assumed that when data in an address which does not match any of the key-addresses is manipulated, the order determination circuit 224 does not check whether or not the address is consistent with a predetermined order of the key-addresses. With such an arrangement, data in addresses interposed between a plurality of addresses assigned as key-addresses can be manipulated. Accordingly, a control operation for the security function can be performed over a long span in a series of addresses. Since such a security function is difficult to analyze so as to reveal a mechanism thereof, the security function for protecting data from fraudulent manipulation can be improved.

For example, setting of key-addresses (assignment of key-addresses and order of key-addresses) shown in Table 2(b) can be employed in the electronic apparatus 100. Referring also to Table 1(a), as defined in Table 2(b), the 1st address "0000h" is assigned as key-address 1, the 9th and 17th addresses "1000h" are assigned as key-address 2, the 11th and 19th addresses "00F4h" are assigned as key-address 3, and the 12th and 20th addresses "00F5h" are assigned as key-address 4. The order of key-addresses is key-address 1, key-address 2, key-address 3, and key-address 4.

As described above, with the setting shown in Table 2(a), referring also to Table 1(a), the security function is controlled by the four continuing key-addresses from the 9th address to the 12th address. In the case where a control operation is achieved by a set of continuing key-addresses, in order to lengthen the control operation for the purpose of preventing the control operation of the security function from being easily analyzed, it is necessary to increase the number of key-addresses. However, as described above, since when data in an address which does not match any of key-addresses is manipulated, the order determination circuit 224 does not check whether or not the key-address is consistent with a predetermined order of the key-addresses, by assigning non-continuing addresses as key-addresses, the control operation of the security function can be lengthened without increasing the number of key-addresses. For example, with the setting shown in Table 2(b), the control operation of the security function spans from the 1st address to the 12th address in the Table 1(a). Thus, in order to analyze such a long security deactivation operation, a long series of addresses must be analyzed. As a result, it becomes more difficult to determine the deactivation mechanism of the security function.

Alternatively, according to embodiment 2 of the present invention, when data in a plurality of addresses matched with key-addresses is manipulated in a wrong order (i.e., in an order different from a predetermined order), manipulations of data in addresses which have already been performed for deactivating the security function may be cancelled by the order determination circuit 224. In such a case, it becomes more difficult to analyze the security function, and accordingly, the security function can be further strengthened.

Now, consider a case where manipulations of data in addresses which have already been performed are not cancelled even when data in a plurality of addresses matched with key-addresses are manipulated in a wrong order. In the electronic apparatus 100, when the setting of Table 2(a) is selected, and manipulation of data in addresses is repeated according to the order of Table 1(b), a possibility of deactivating the security function may arise. For example, in the electronic apparatus 100, when manipulation of data is performed according to the addressing order of Table 1(b) based on the setting of Table 2(a), in the first cycle of the addressing order of Table 1(b), data in key-address 3, key-address 4, key-address 1, and key-address 2 are manipulated in this order, and thus, the security function is not deactivated. Then, in the second cycle, data in the key-addresses are manipulated in the same order (i.e., key-address 3, key-address 4, key-address 1, and key-address 2). If the manipulations for the key-addresses in the first cycle are not cancelled before the second cycle, the order determination circuit 224 recognizes that the manipulations for key-addresses 1 and 2 in the first cycle and the manipulations for the key-addresses 3 and 4 in the second cycle are performed according to the predetermined order (key-address 1, key-address 2, key-address 3, and key-address 4), whereby the security function is deactivated.

As described above, in a structure in which when data in an address which does not match any of the key-addresses is manipulated, the order determination circuit 224 does not check whether or not the key-address is consistent with a predetermined order of the key-addresses, the setting of Table 2(b) can be employed. In this case, when manipulation of data in addresses is repeated according to the order of Table 1(b), in the first cycle of the addressing order of Table 1(b), data in key-address 1, key-address 3, key-address 4, and key-address 2 are manipulated in this order. Then, in the second cycle, data in the key-addresses are manipulated in the same order. If the manipulations for the key-addresses in the first cycle are not cancelled before the second cycle, the order determination circuit 224 recognizes that the manipulations for key-addresses 1 and 2 in the first cycle and the manipulations for key-addresses 3 and 4 in the second cycle are performed according to the predetermined order (key-address 1, key-address 2, key-address 3, and key-address 4), whereby the security function is deactivated.

In such a structure which merely determines that data in addresses corresponding to key-addresses have been manipulated according to a predetermined order, if a mechanism which inhibits an operation for deactivating the security function is not provided, through repetition of data manipulation, the security function may be relatively easily deactivated. On the other hand, in an alternative example, when data in addresses corresponding to key-addresses are manipulated according to an order different from the predetermined order, manipulations of data in addresses which have already been performed are cancelled, whereby it becomes more difficult to deactivate the security function. An example of such is described below.

In this example, in the electronic apparatus 100 including the semiconductor storage device 250, the setting shown in Table 2(b) is employed, and data in addresses are manipulated according to the incremental order shown in Table 1(b). The first key-address which is accessed after data in address "0000h" matched with key-address 1 has been manipulated is key-address "00F4h". Since this is not consistent with the predetermined order in Table 2(b), manipulation of data in address "0000h" matched with key-address 1 is cancelled. Also during and after the second cycle, the first key-address which is accessed after data in address "0000h" matched with key-address 1 has been manipulated is key-address "00F4h". Thus, manipulation of data in address "0000h" matched with key-address 1 is cancelled every time data in address "00F4h" matched with key-address 3 is manipulated. That is, even when manipulation of data is repeated according to the order shown in Table 1(b), the predetermined order of the key-addresses cannot be satisfied. Therefore, the security function cannot be deactivated.

Thus, in the above structure, an undesirable, irregular deactivation of the security function can be prevented even when manipulation of data in the key-addresses according to an order different from the predetermined order is repeated. As a result, the security function can be strengthened.

The above example may be arranged such that when manipulation of data in the key-address is performed according to an order different from the predetermined order while the security function is active, the security function will never be deactivated until a reset operation or the like is completed. Furthermore, the above example may be arranged such that deactivation of the security is enabled by a reset operation or the like, and at the same time, manipulation of data which has already been performed can be reset. In such an arrangement, after the reset operation has been performed, manipulation of data stored in the key-addresses must be resumed from key-address 1. Since a reset operation is necessarily performed every time data in the key-addresses is manipulated according to an order different from the predetermined order, it becomes more difficult to obtain a condition for deactivating the security function by trial and error.

It should be noted that in the above structure, in order to assure that manipulation of data is not performed according to an order different from the predetermined order of the key-addresses before the security function is deactivated by an authentic method of use, a deliberate verification needs to be performed after completion of a program.

Alternatively, the security function can be strengthened with a structure in which the security function cannot be deactivated even when addresses to be accessed for manipulation match a plurality of key-addresses.

For example, in the case where key-addresses are stored in a rewritable storage means, when one address is assigned as a plurality of key-addresses, or when an address in a loop which is repeatedly accessed for manipulation is assigned as a key-address, a possibility that the storage means for the key-addresses is rewritten by fraudulent access of an unauthorized person may arise.

When all of the key-addresses correspond to a single address, a possibility of falsely deactivating the security function increases. Furthermore, in the case where a storage means, such as an EEPROM, in which all of the memory contents can be erased at one time and can be changed into one and the same memory content is used as a storage means for storing key-addresses, the key-addresses stored in such a memory may be changed into the same data. Even in such a case, for the purpose of preventing fraudulent manipulation of data, the order determination circuit 224 is arranged such that the security function cannot be deactivated until a data manipulation order for a plurality of addresses match a predetermined data manipulation order for a plurality of key-addresses. With such an arrangement, an undesirable deactivation of the security function can be prevented even when the key-addresses in the storage means are erased.

Furthermore, in another example according to embodiment 2 of the present invention, when a data manipulation order of key-addresses matches the predetermined order of key-addresses except that data in an address matched with any of the key-addresses is repetitively manipulated, it may be determined that this data manipulation order of key-addresses matches the predetermined order. With such an arrangement, the degree of freedom for the setting of key-addresses is increased.

In this example, the setting of key-addresses shown in Table 2(c) is employed. As defined in Table 2(c), also referring to Table 1(a), the 1st address "0000h" is assigned as key-address 1, the 9th and 17th addresses "1000h" are assigned as key-address 2, the 25th address "00FAh" is assigned as key-address 3, and the 26th address "00FBh" is assigned as key-address 4. The order of key-addresses is key-address 1, key-address 2, key-address 3, and key-address 4.

As shown in Table 1(a), data in key-address 2 is manipulated by the 9th and 17th accesses. Accordingly, data in key-addresses 1–4 is manipulated in order of key-address 1, key-address 2, key-address 2, key-address 3, and key-address 4. That is, data manipulation in an address matched with key-address 2 repetitively occurs twice.

According to the present invention, when data manipulation in an address matched with key-address 2 occurs in succession, the order determination circuit 224 (FIG. 3A) may determine that such an order is different from the predetermined order. As a result, preceding data manipulations for the key-addresses may be cancelled, or deactivation of the security function may be disabled afterward. However, in such a case, address "1000h" cannot be used as key-address 2 because address "1000h" is used several times within a cycle of a reading operation. Thus, the degree of freedom for the setting of key-addresses is limited.

Alternatively, when a data manipulation order of key-addresses matches the predetermined order of key-addresses except that data in an address matched with any of the key-addresses is repetitively manipulated, it may be determined that this data manipulation order of key-addresses matches the predetermined order. With such an arrangement, the degree of freedom for the setting of key-addresses is not limited.

Figure 3B:
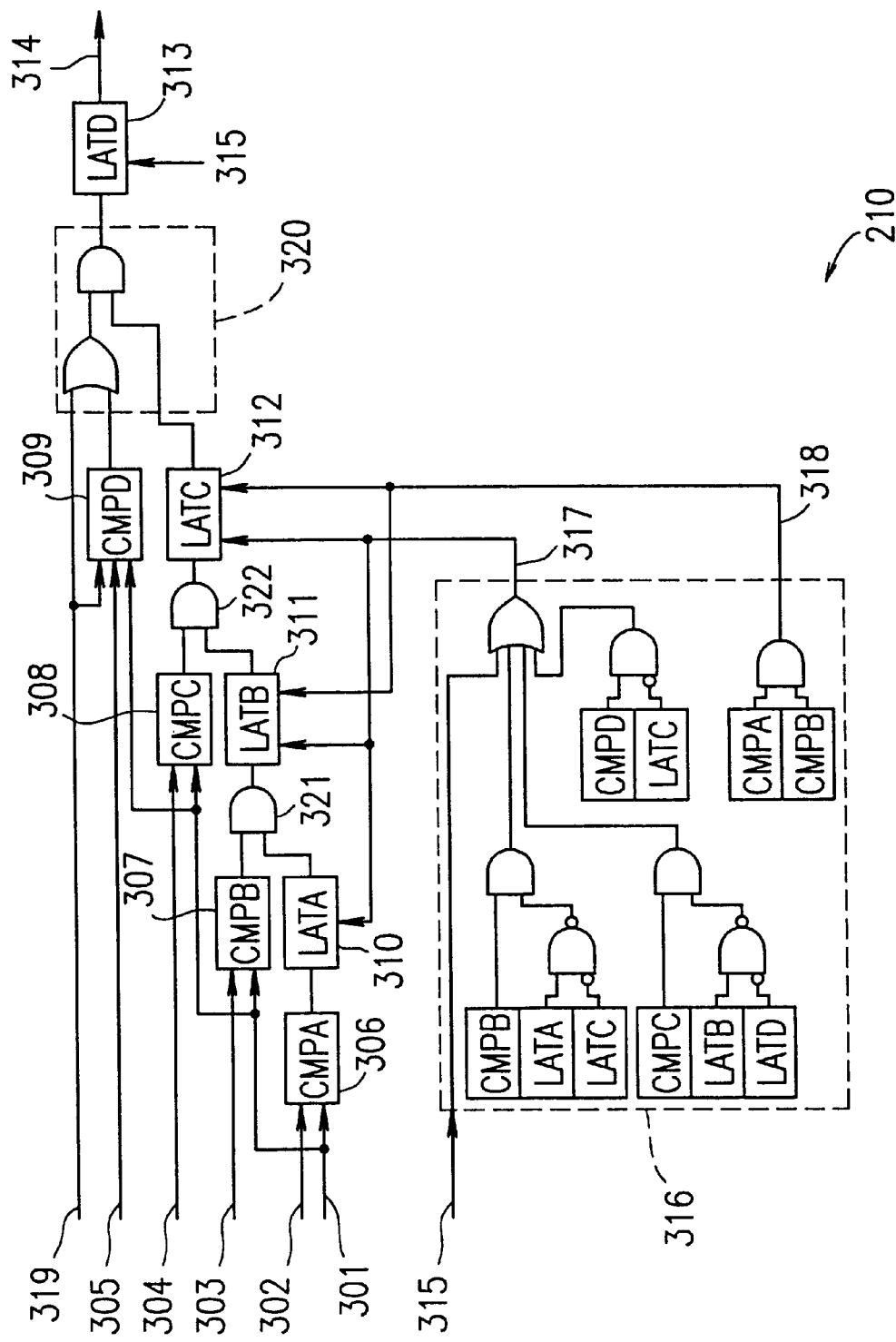
FIG. 3B is a specific example of a security control circuit for use in the semiconductor storage device shown in FIG. 3A.

A specific example of the security control circuit 210 is shown in FIG. 3B. In the security control circuit 210, four key-addresses are provided. The security function is deactivated when data manipulations for the key-addresses are performed in a predetermined order: key-address A, key-address B, key-address C, and key-address D. When data in an address other than the key-addresses is manipulated, determination of the data manipulation order is not performed. When data manipulations for the key-addresses are performed in an order different from the predetermined order, preceding determined matches are cancelled. When a data manipulation order of key-addresses matches the predetermined order of key-addresses except that data in an address matched with any of the key-addresses is repetitively manipulated, the security control circuit 210 determines that this data manipulation order of key-addresses matches the predetermined order.

In the security control circuit 210, when the power of a semiconductor storage device is turned on, or when a reset operation of the semiconductor storage device is performed, a reset signal is output through a bus 315, whereby the security function is activated.

As shown in FIG. 3B, the security control circuit 210 includes a comparator circuit A (CMPA) 306, a comparator circuit B (CMPB) 307, a comparator circuit C (CMPC) 308, a comparator circuit D (CMPD) 309, a latch circuit A (LATA) 310, a latch circuit B (LATB) 311, a latch circuit C (LATC) 312, a latch circuit D (LATD) 313, a latch reset determination circuit 316, and a key-address D deactivation circuit 320 for deactivating key-address D.

The key-address D deactivation circuit 320 receives a cancellation signal through a bus 319, and in response to the cancellation signal; changes a condition for deactivating the security function such that the security function is deactivated by manipulating data in the key-addresses in the order of key-address A, key-address B, and key-address C.

The comparator circuits 306–309 each compare an address signal indicating an address to be accessed, which has been obtained through a data bus 301, and each of key-address signals indicating key-addresses A–D from respective address buses 302–305. In each of the comparator circuits 306–309, when the address signals match any of key-addresses A–D, a match signal is generated.

The LATA 310 is reset by a reset signal obtained through a bus 317 so as to output a low level signal. The LATB 311 and the LATC 312 are reset by the reset signal obtained through the bus 317 or the reset signal obtained through a bus 318 so as to output a low level signal. The LATD 313 is reset by a reset signal obtained through a bus 315 so as to output a low level signal. The latch circuits 310–313 are each latched so as to output a high level signal when an input bus thereof goes to a high level.

When the security function is activated, a latch reset signal is supplied to the data bus 315, and a latch circuit in the latch reset determination circuit 316 is reset. Each of the latch circuits 310–312 is reset by a latch reset signal generated in the latch reset determination circuit 316 and supplied through the data bus 317, and is latched so as to output a low level signal. The LATD 313 is reset by a latch reset signal supplied through the data bus 315, and latched so as to output a low level signal.

In the security control circuit 210 having such a structure, for example, while the cancellation signal for deactivate key-address D is at a low level, when data manipulation for key-addresses is performed according to the predetermined order of key-addresses, a security function is deactivated. An operation of such a case is described below.

When data in an address matched with key-address A is manipulated, the CMPA 306 generates a match signal, whereby the LATA 310 is latched so as to output a high level signal. Then, when data in an address matched with key-address B is manipulated, the CMPB 307 generates a match signal. Since the LATA 310 is latched so as to output a high level signal, the LATB 311 is latched so as to output a high level signal.

Then, when data in an address matched with key-address C is manipulated, the CMPC 308 generates a match signal. Since the LATB 311 is latched so as to output a high level signal, the LATC 312 is latched so as to output a high level signal. Then, when data in an address matched with key-address D is manipulated, the CMPD 309 generates a match signal. Since the LATC 312 is latched so as to output a high level signal, the LATD 313 is latched so as to output a high level signal.

The LATD 313 being latched so as to output a high level signal means that data in the key-addresses has been manipulated according to the predetermined order of key-addresses A–D. That is, the condition for deactivating the security function is satisfied. Accordingly, the security control circuit 210 outputs a security deactivation signal through a bus 314 to the outside thereof.

When data in an address matched with key-address A is manipulated in a wrong order, the latch reset determination circuit 316 outputs a latch reset signal through the bus 318, whereby the LATB 311 and the LATC 312 are reset so as to output a low level signal. When data in addresses matched with key-addresses B–D is manipulated in a wrong order, the latch reset determination circuit 316 outputs a latch reset signal through the bus 317, whereby the LATA 310, the LATB 311 and the LATC 312 are reset so as to output a low level signal. When data in key-addresses is manipulated in an order different from the predetermined order of key-addresses, data manipulation in addresses which have already been performed are cancelled by an operation of the latch reset determination circuit 316.

As described above, only the LATD 313 is not reset by the operation of the latch reset determination circuit 316 even if data in an address matched with key-address A is manipulated in a wrong order. This is for keeping the security function inactive after the security function has been once deactivated until a reset signal is supplied again through the bus 315. If the LATD 313 were reset by a reset signal from the latch reset determination circuit 316, the security function might be activated at an undesirable time. With such a structure, data manipulation in addresses matched with the key-addresses after deactivation of the security function does not influence the security function. Thus, a program can be developed without considering the security function.

Furthermore, by arranging this example such that the LATA 310 is not reset when data in an address matched with key-address A is manipulated in a wrong order, setting of key-addresses can be easily determined. For example, in the case where data in the key-addresses is manipulated in the order of key-address A, key-address B, key-address A, key-address B, key-address C, and key-address D, if the LATA 310 were reset in response to the second data manipulation for key-address A, the security function would not be deactivated although data manipulation in the last four key-addresses A–D is performed according to the predetermined order.

That is, there is a possibility that data manipulation in an address matched with a key-address which is not used for controlling the security function (in this example, data manipulation in addresses matched with the first key-addresses A and B) may influence control of the security function. Thus, such a problem should be considered in the setting of the key-addresses. Thus, embodiment 2 of the present invention may be arranged such that when data in the address matched with key-address A is manipulated in a wrong order, the LATA 310 is not reset. With such an arrangement, the above problem is avoided.

When the cancellation signal 319 is at a high level, data manipulation in an address matched with key-address D is not used for deactivating the security function. When data manipulation in addresses matched with key-address A, key-address B, and key-address C is performed according to the predetermined order of key-addresses, the security function is deactivated.

When the cancellation signal 319 is at a low level, the key-address D deactivation circuit 320 works as an OR circuit for outputs of the CMPD 309 and the LATC 312. On the other hand, when the cancellation signal 319 is at a high level, the key-address D deactivation circuit 320 outputs the same logic as that of the LATC 312 regardless of the output of the CMPD 309, whereby the LATD 313 is set so as to output a high level signal. Therefore, when data manipulation in key-addresses is performed in an order of key-address A, key-address B, and key-address C, the security function is deactivated. After the LATC 312 outputs a high level signal to the LATD 313 through the key-address D deactivation circuit 320, the latch reset determination circuit 316 outputs a reset signal through the bus 317, and the LATA 310, the LATB 311, and the LATC 312 are reset by the reset signal. This reset operation does not influence the security function because the LATD 313 has already been latched so as to output a high level signal.

However, when such a racing is recognized as being undesirable in respect to design, the logic may be modified so that the cancellation signal 319 is supplied to the latch reset determination circuit 316 so as to output reset signals through the buses 317 and 318, thereby avoiding resetting of the LATA 310, the LATB 311, and the LATC 312.

As described hereinabove, with the structure of the security determination circuit 350 shown in FIG. 3B, a function for determining whether a data manipulation order for key-addresses matches the predetermined order of key-addresses can be achieved.

In the above-described structure according to embodiment 2, four key-addresses can at most be used. However, the number of key-addresses is not limited to four. While the number of key-addresses increases, circuit size also increases. On the contrary, with a greater number of key-addresses, the possibility that security is penetrated is decreased. Thus, any number of key-addresses which is supposed to be optimum or sufficient may be selected in view of security strength and chip size, which are required considerations for a semiconductor storage device used. As described above, embodiment 2 is arranged such that a key-address use flag which deactivates any of key-addresses is employed, whereby the number of key-addresses can be freely reduced.

Furthermore, in some of the above-described examples according to embodiments 1 and 2, when data in an address is manipulated, the address is necessarily compared with the key-addresses. The comparison scheme may be arranged such that only when data in an address is manipulated during a part of an operation, such as a reading operation, a writing operation, etc., the address is compared with the key-addresses. Furthermore, addresses to be compared with the key-addresses may be limited to addresses in a part of the memory space.

In the case where a rewritable storage device is used as storage means for storing key-addresses or key-address use flags, the present invention can be adapted to a change of a program, etc.

Japanese Laid-Open Publication No. 3-204053 discloses a related art technique in the same field as embodiment 2 of the present invention, in which, when an addressing operation for reading data is not performed according to a predetermined order, data which has already been read out is cancelled. This related art technique is similar to the present invention in respect to the setting of an accessing order of specific addresses from which data is read out. However, in this related art technique, it is required to verify that irregular manipulation which does not fall within the predetermined setting never occurs, and it is difficult to control the security function over a long time period because security control depends only on the number of key-addresses. Due to such disadvantages, this related art technique is different in nature from the present invention, and thus, cannot be employed in place of the present invention.

(Embodiment 3)

One of the features of embodiment 3 of the present invention is that match determination between key-addresses and an address in which data is to be manipulated is performed only in respect to part of the address. With such a feature, circuit size is reduced, and accordingly, a chip area is reduced. Embodiment 3 can be easily enabled in the semiconductor storage device 250 of FIG. 3A which is employed in embodiment 2. Thus, in a description below, embodiment 3 is carried out in the semiconductor storage device 250.

According to embodiment 2, in the electronic apparatus 100 (FIG. 2), a memory space including the semiconductor storage device 150 and the semiconductor storage device 160 is divided into addresses represented by 16 bits. Therefore, the key-address storage circuit 213 is required to have a capacity which can store data of at least 16 bits×(the number of key-addresses). The comparator circuits 220–223 in the security circuit 206 of the semiconductor storage device 250 shown in FIG. 3A are each required to compare at least two 16-bit signals.

According to embodiment 3, as described above, match determination between key-addresses and an address in which data is to be manipulated is performed only with respect to part of the address, whereby circuit size of the comparator circuits 220–223 can be reduced. For example, the 8 low-order bits of the key-addresses are set such that the match determination is performed, as shown in Table 2(d), between the 8 low-order bits of the key-address and the 8 low-order bits of the address in which data is to be manipulated. Even with such a setting, the security function can be deactivated by an deactivation mechanism similar to that described in embodiment 2 in which all of the 16 bits of the addresses are compared.

Thus, the key-address storage circuit 213 is only required to store 8 bits for one key-address, and the comparator circuits 220–223 are each only required to compare the 8 low-order bits of the key-address with the 8 low-order bits of the address in which data is to be manipulated. In such a case, circuit size can be reduced as compared to a case where all of the 16 bits of the addresses are compared.

(Embodiment 4)

Hereinafter, a semiconductor storage device 450 according to embodiment 4 of the present invention will be described with reference to FIG. 4.

In the semiconductor storage device 450, both activation and deactivation of the security function can be performed.

One of the features of embodiment 4 of the present invention is utilizing storage means in the semiconductor storage device 450 (specifically, a memory 409) for storing key-addresses. For example, when the memory 409 of the semiconductor storage device 450 is a mask ROM, key-addresses are stored in a storage element of the mask ROM. When the memory 409 of the semiconductor storage device 450 is an SRAM, key-addresses are stored in a storage element of the SRAM. When the semiconductor storage device 450 has a plurality of memories, at least one of these memories is utilized as storage means for key-addresses.

Figure 4:
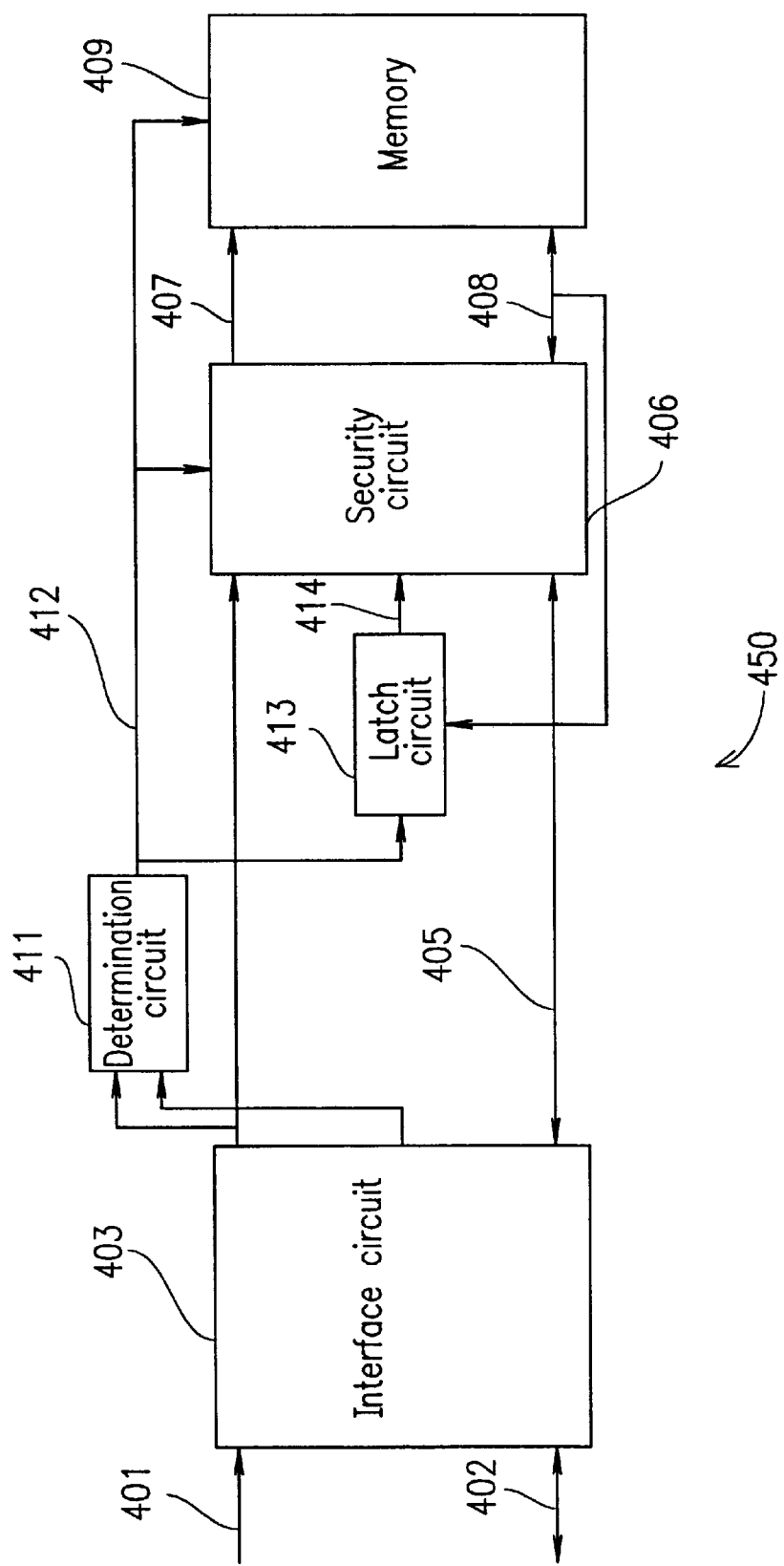
FIG. 4 is a block diagram showing still another example of a semiconductor storage device according to the present invention.

The semiconductor storage device 450 shown in FIG. 4 includes an interface circuit 403, a security circuit 406, the memory 409 having a memory space, a determination circuit 411, and a latch circuit 413. A security function of the semiconductor storage device 450 is controlled using key-addresses. The key-addresses are stored in a storage element included in the memory 409.

When a signal pattern externally supplied through an input bus 401 or an input/output bus 402 (an address signal or a key-address control signal) includes an instruction in which the key-addresses are to be transmitted to the latch circuit 413, the determination circuit 411 determines that transmission of key-addresses are instructed by the address signal or key-address control signal, and outputs a key-address read signal to a data bus 412. The memory 409 directly or indirectly receives the key-address read signal, and outputs the key-addresses stored in the storage element through a data bus 408. The latch circuit 413 receives the key-address read signal through the data bus 412, and in response to the key-address read signal, latches a data content of a data signal which has been received from the memory 409 through the data bus 408. The data contained in the latch circuit 413 is transmitted to the security circuit 406 through the key-address bus 414, and a content of this data is used for controlling the security function.

A region of the memory 409 (storage element) in which the key-addresses are stored is protected by the security function so that a normal reading operation cannot be performed in this region. With such a structure, reading of the key-addresses by an unauthorized person can be prevented. Specifically, receiving the key-address read signal through the data bus 412, the security circuit 406 performs any predetermined operation to a signal received from the memory 409 through the data bus 408 and outputs a signal obtained by the operation through the data bus 405, whereby the above protection of the key-addresses can be achieved.

Furthermore, according to embodiment 4, the determination circuit 411 may operate such that the key-address read signal is automatically transmitted to the latch circuit 413 every time the semiconductor storage device 450 is powered on, or every time a reset operation is performed. With such an arrangement, it is not necessary to externally provide special control before control of the security function is performed.

When the semiconductor storage device 450 is a non-volatile semiconductor storage device, a program stored therein is not lost by power-off. Therefore, it is preferable that the key-addresses for controlling the security function be stored in non-volatile semiconductor storage means. Especially in the case of a non-volatile semiconductor storage device in which memory contents cannot be modified, such as a mask ROM, when the security function is controlled using the key-addresses, the key-addresses used need not be modified. Therefore, it is considerably effective to store the key-addresses in the same storage element as the program.

On the other hand, when the semiconductor storage device 450 is a rewritable semiconductor storage device, such as an EPROM, a program stored therein can be rewritten. Therefore, when the program is rewritten, in the case where a single key-address is used, the key-address can be read out by an unauthorized person. However, even in such a case, if the key-addresses are stored in the same storage means as the program, the key-addresses can be rewritten by the same rewriting means as that used for storing a program. In a volatile semiconductor storage device, contents to be stored are not always the same. Thus, in general, the key-addresses can be externally provided after the semiconductor storage device has been powered on.

According to embodiment 4, storage means which the semiconductor storage device already includes is used as storage means for key-addresses. Therefore, when the semiconductor storage device is a rewritable storage device, the key-addresses can be written by the same rewriting means as that used for writing a program. For example, when embodiment 4 of the present invention is applied to an EEPROM, an EEPROM cell is also used for storing the key-addresses. Therefore, the key-addresses can be rewritten utilizing rewriting means for rewriting data in a memory array. Thus, it is not necessary to provide special means exclusively used for storing the key-addresses.

As described above, according to embodiment 4, appropriate key-address storage means can be provided for each of the various types of semiconductor storage devices, and in addition, it is not necessary to provide a special storage element exclusively used for storing the key-addresses. Thus, a production process and influence on reliability test can be reduced.

(Embodiment 5)

Hereinafter, row line structures according to embodiment 5 of the present invention will be described with reference to FIGS. 5A and 5B.

According to embodiment 5, increase in chip size due to additional storage means for key-addresses can be suppressed. FIGS. 5A and 5B each diagrammatically show a row line structure of a storage element in a semiconductor storage device including a security function in which the security function is controlled using key-addresses.

The row line structure shown in FIG. 5A includes 256 row lines used as a storage element and redundant row lines WLR0 and WLR1 for replacing defective lines among the 256 row lines. Furthermore, the row line structure includes a special row line WLSEC for storing key-addresses which is one of the row lines of the storage element. These row lines are all included in one memory array, and the row line WLSEC stores key-addresses for security control. Thus, a memory cell having a structure similar to that of storage means provided in the semiconductor storage device or a memory cell connected to the redundant row line is provided for storing key-addresses. As a result, it is not necessary to provide another storage means such as a special memory array for storing key-addresses. For example, the key-addresses are stored in the memory which has a redundant memory structure including at least one address for storing the key-addresses.

In the row line structure shown in FIG. 5B, a row line exclusively used for storing key-addresses is not provided. That is, this structure is the same as a typical row line structure including redundant row lines. A storage element connected to one of redundant row lines WLR0 and WLR1 which is not used for replacing a defective row line among the row lines WL0–255 is used for storing key-addresses. In this case, the number of redundant row lines for replacing a defective row line decreases, but it is not necessary to additionally provide key-address storage means. Accordingly, the chip area decreases. Thus, yield of non-defective products per wafer can be increased according to a defect probability or a number of redundant row lines. For example, the key-addresses are stored in the memory, and an address in the memory for storing data of one of the key-address can be used for storing data of an address in the memory which is different from the key-addresses.

According to embodiment 5, storage means which the semiconductor storage device already includes is used as storage means for key-addresses. Therefore, when the semiconductor storage device is a rewritable storage device, the key-addresses can be written by the same rewriting means as that used for writing a program. For example, when embodiment 5 is applied to an EEPROM, an EEPROM cell is also used for storing the key-addresses. Therefore, the key-addresses can be rewritten utilizing rewriting means for rewriting data in a memory array. Thus, it is not necessary to provide another special means exclusively used for storing the key-addresses.

In the above example according to embodiment 5, the key-addresses are stored in the storage element having a row line structure similar to that of storage means provided in the semiconductor storage device. Such a structure can be applied to column lines. Furthermore, information associated with the security control other than key-addresses can be stored in these storage elements.

(Embodiment 6)

Hereinafter, a semiconductor storage device 550 according to embodiment 6 of the present invention will be described with reference to FIG. 6.

Figure 6:
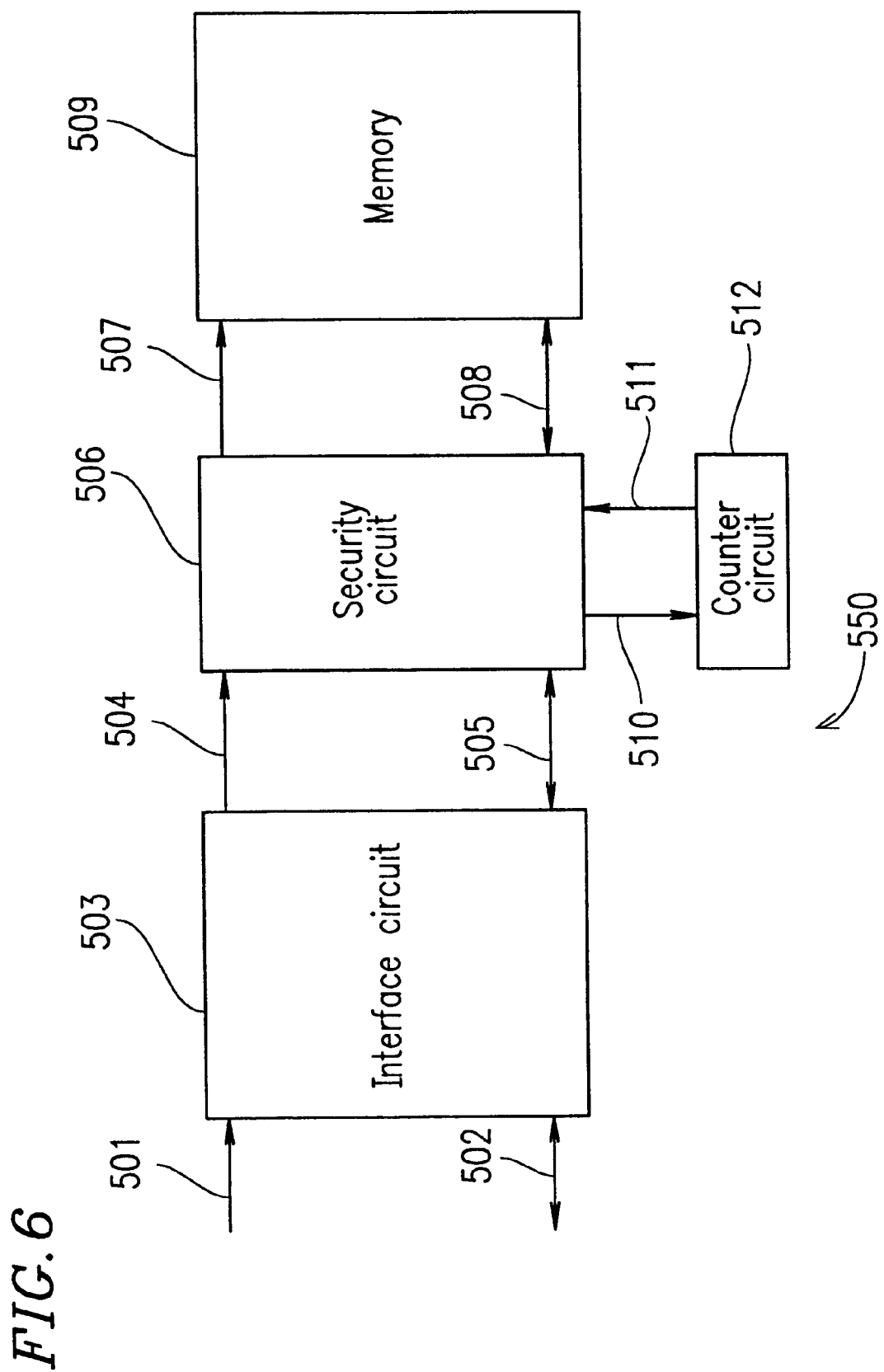
FIG. 6 is a block diagram showing still another example of a semiconductor storage device according to the present invention.

The semiconductor storage device 550 shown in FIG. 6 includes an interface circuit 503, a security circuit 506, a memory 509 having a memory space, and a counter circuit 512.

The interface circuit 503 receives an input signal from the outside through an input bus 501, and outputs an address signal to the security circuit 506 through an address bus 504. The security circuit 506 outputs an address signal to the memory 509 through an address bus 507. Between the security circuit 506 and the memory 509, data signals are transmitted through a data input/output bus 508. Between the interface circuit 503 and the security circuit 506, data signals are transmitted through a data input/output bus 505. The security circuit 506 outputs a security change signal to the counter circuit 512 through a data bus 510. Furthermore, the counter circuit 512 outputs to the security circuit 506 a count signal indicating the number of times that a security function has been activated or the number of times that a security function has been deactivated.

A security operation of the semiconductor storage device 550 having such a structure is described.

When the security circuit 506 determines that a condition for activating/deactivating the security function is satisfied, the security circuit 506 generates a security change signal. Receiving the security change signal, the counter circuit 512 increments the number of counts held therein, and outputs a counted-number signal to the security circuit 506 through a data bus 511.

The security circuit 506 changes a condition for activating/deactivating the security function according to the number of times that the security function has been activated or the number of times that the security function has been deactivated which is indicated by the counted-number signal.

In the above example according to embodiment 6, the counter circuit 512 counts the number of times that the security change signal has been generated. However, any operation is within the scope of the present invention as long as the counted-times signal can be changed in response to input of the security change signal.

Thus, by providing means for storing an operation result of the counter circuit 512 into a rewritable non-volatile memory cell, a condition for deactivating the security function cannot be reset even when the semiconductor storage device 550 is reset by a power-off, etc.

(Embodiment 7)

The semiconductor storage device 550 shown in FIG. 6 can be used for an embodiment different from embodiment 6. A control operation for a security function according to embodiment 7 is described with reference to Table 3.

TABLE 3

| Security: active | 0000h-3FFFh reading permitted |
| | 4000h-EFFFh reading prohibited |
| 1st deactivation | 0000h-7FFFh reading permitted |
| | 8000h-EFFFh reading prohibited |
| 2nd deactivation | 0000h-7FFFh reading prohibited |
| | 8000h-9FFFh reading permitted |
| | A000h-EFFFh reading prohibited |
| 3rd deactivation | 0000h-9FFFh reading prohibited |
| | A000h-BFFFh reading permitted |
| | C000h-EFFFh reading prohibited |
| 4th deactivation | 0000h-BFFFh reading prohibited |
| | C000h-EFFFh reading permitted |

*The security state after the 5th deactivation returns to the security state after the 1st deactivation.

Addresses "0000h" to "EFFFh" of the memory space are allocated to the semiconductor storage device 550, and the security function is activated for these addresses at power-on. The counter circuit 512 counts the number of times that the security function has been deactivated. According to embodiment 7, every time the security function is deactivated, addresses protected by the security function are changed as shown in Table 3.

Referring to Table 3, since the security function is active at an initial state, data can only be normally read out from addresses "0000h" to "3FFFh". In such a state, when the security function is deactivated (1st deactivation), reading of data from addresses "0000h" to "7FFFh" is permitted. Thereafter, a condition for activating the semiconductor storage device 550 is satisfied, and accordingly, the security function is activated again, whereby addresses from which reading of data is permitted are limited to addresses "0000h" to "3FFFh" only.

After the 1st security deactivation, when a condition for deactivating the security function is satisfied (2nd deactivation), data can only be normally read from addresses "8000h" to "9FFFh".

As described above, every time the security function is deactivated, a region in the memory space from which reading of data is permitted is changed. With such a structure, when an unauthorized person attempts to fraudulently read data, he/she must satisfy the condition for deactivating all of the security functions. Thus, it is extremely difficult to completely read all of the memory contents fraudulently.

According to embodiment 7, the semiconductor storage device can be used together with a function of embodiment 6 in which a condition for activating/deactivating the security function is changed in response to activation/deactivation of the security function.

(Embodiment 8)

Hereinafter, an electronic apparatus according to embodiment 8 of the present invention will be described with reference to FIGS. 7 and 12.

Figure 7:
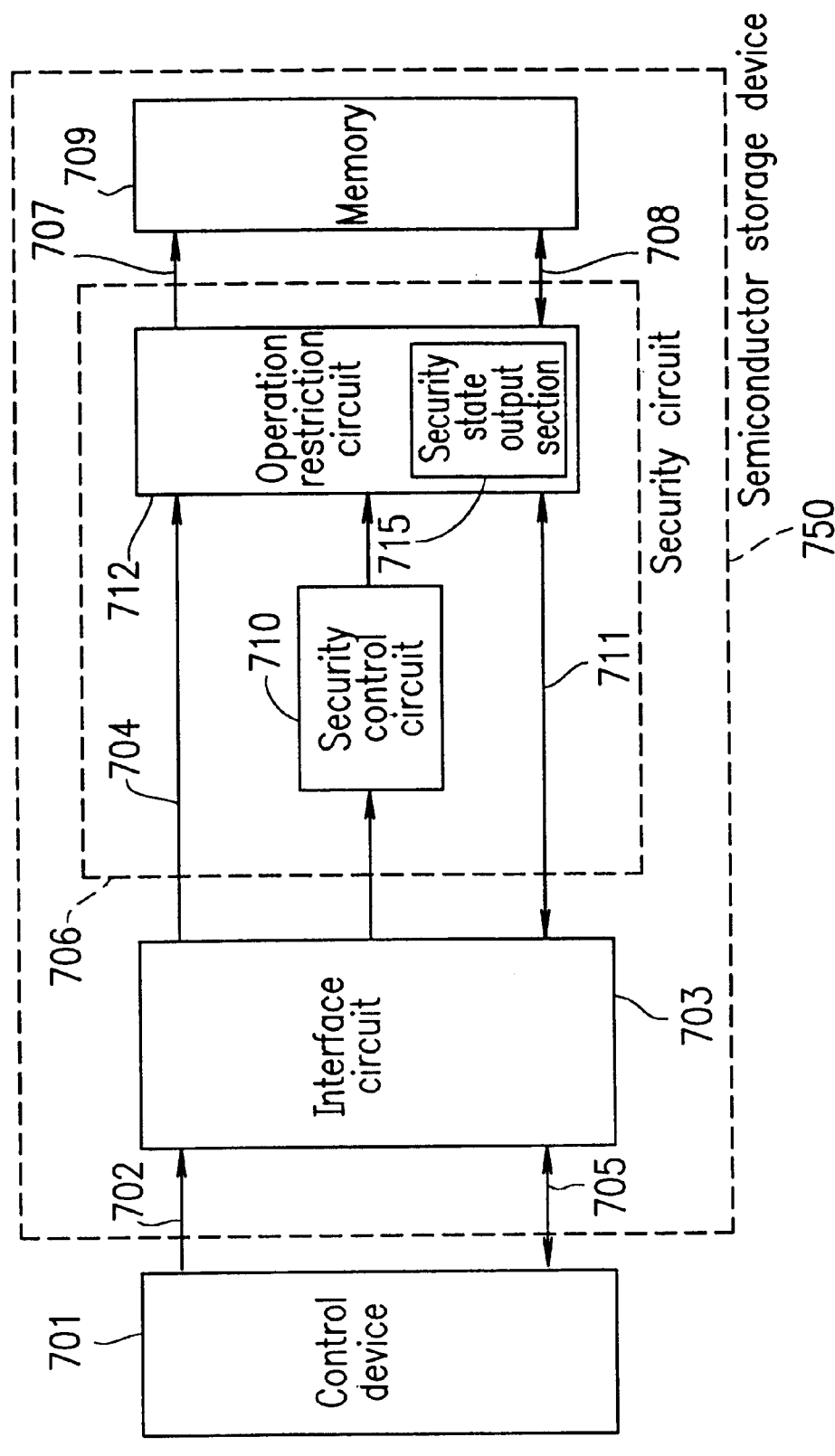
FIG. 7 is a block diagram showing another example of an electronic apparatus according to the present invention.

FIG. 7 shows an electronic apparatus 760 according to embodiment 8 of the present invention. The electronic apparatus 760 includes a semiconductor storage device 750 and a control device 701 for controlling the semiconductor storage device 750. The semiconductor storage device 750 includes an interface circuit 703, a security circuit 706, and a memory 709 having a memory space.

The interface circuit 703 receives an address signal from the control device 701 through an input bus 702, and outputs the address signal to the security circuit 706 through an address bus 704. The security circuit 706 outputs the address signal to the memory 709 through an address bus 707. Between the security circuit 706 and the memory 709, data is transmitted though a data input/output bus 708. Furthermore, between the interface circuit 703 and the security circuit 706, data is transmitted though a data input/output bus 711.

The security circuit 706 of the semiconductor storage device 750 includes a security control circuit 710 and an operation restriction circuit 712 for restricting a security function based on an output of the security control circuit 710. The operation restriction circuit 712 includes a security state output section 715.

In the semiconductor storage device 750, the security function is activated at power-on (i.e., after power-on, reading of data from the memory space is restricted until a condition for deactivating the security function is satisfied). In this example, the condition for deactivating the security function is reading data from a specific address "ADD1".

Figure 8:
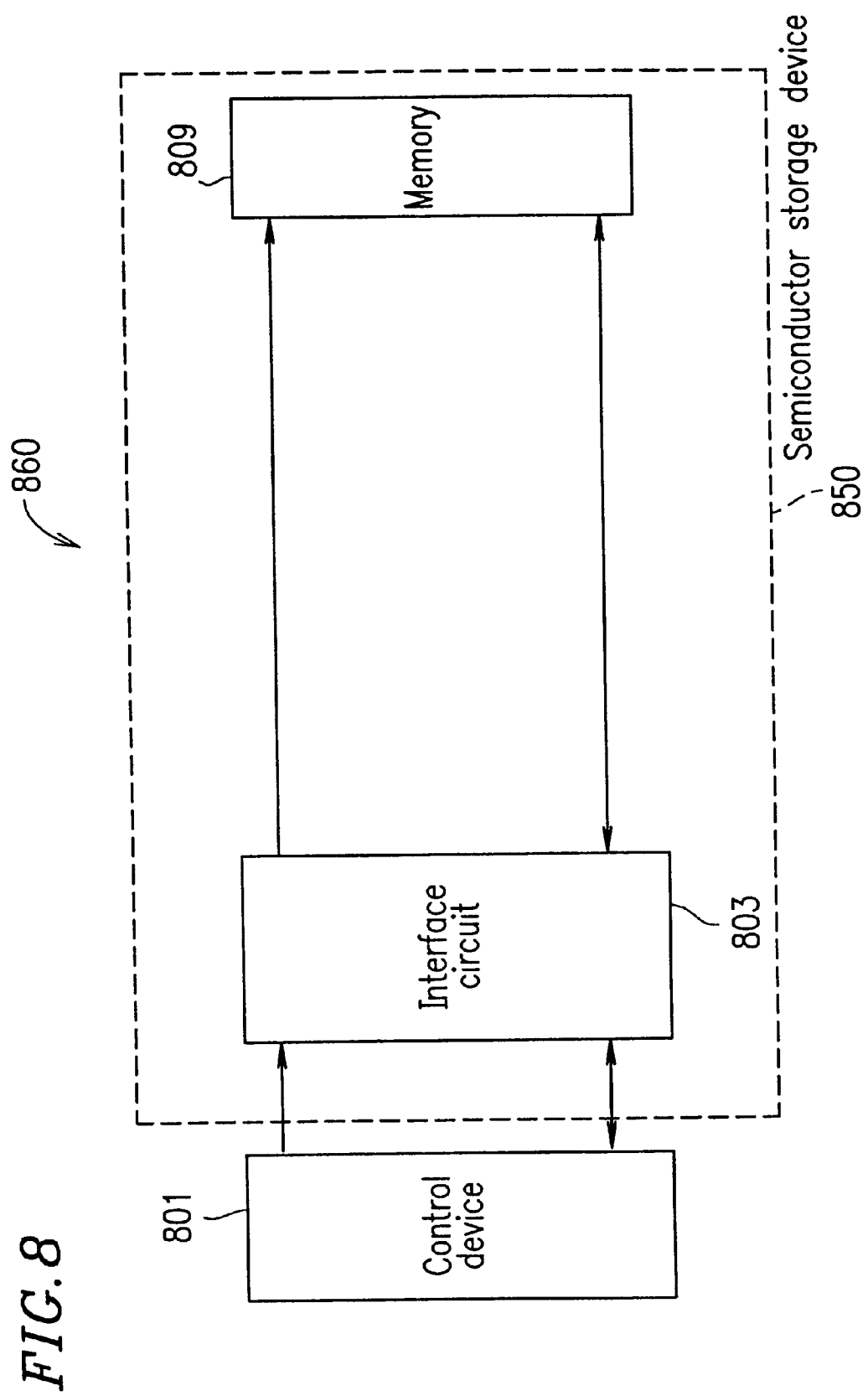
FIG. 8 is a block diagram showing an example of a conventional electronic apparatus.

FIG. 8 is a block diagram showing an example of a conventional electronic apparatus 860. The electronic apparatus 860 includes a semiconductor storage device 850 which is a copy (counterfeit) product, and a control device 801 for controlling the semiconductor storage device 850. Herein, the copy product is a type of fraudulent article. It is assumed that the semiconductor storage device 850 contains memory contents of the semiconductor storage device 750 which have been fraudulently read out by an unauthorized person from the semiconductor storage device 750 despite the security function thereof and copied into the semiconductor storage device 850. Therefore, in the semiconductor storage device 750 and in the semiconductor storage device 850, the same data is stored in the same address. In this example, the semiconductor storage device 850 does not have a security function, or the semiconductor storage device 850 has a security function, but the security function is inactive.

Figure 9:
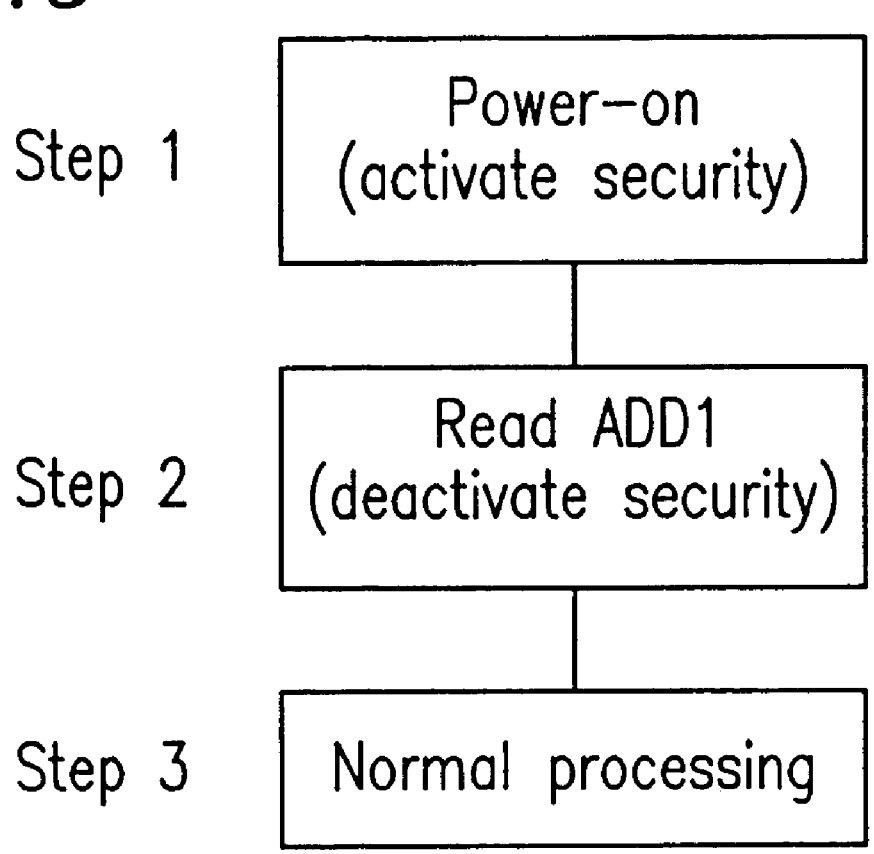
FIG. 9 is a flowchart showing an example of a control operation of a control device in the electronic apparatus shown in FIG. 8.

Next, a control operation of the semiconductor storage device 750 of the present invention using the control device 801 of the conventional electronic apparatus 860 shown in FIG. 8 is described with reference to a flowchart of FIG. 9. In the flowchart of FIG. 9, only process steps for the security function are shown, and other process steps in the control device 801 are omitted.

At Step 1, the control device 801 activates the security function of the semiconductor storage device 750 at power-on. That is, at least a part of the memory contents stored in the memory 709 of the semiconductor storage device 750 cannot be read out at Step 1. At Step 2, the control device 801 performs a deactivation operation for the security function of the semiconductor storage device 750, whereby the security function of the semiconductor storage device 750 is deactivated. Accordingly, at and after Step 3, the control device 801 can freely read the memory contents from the semiconductor storage device 750. At Step 3, the control device 801 confirms whether or not the security function of the semiconductor storage device 750 has been successfully deactivated. If the deactivation has been successfully carried out, the control device 801 begins normal operation. Otherwise, the control device 801 begins abnormal operation.

For comparison, a control operation of the semiconductor storage device 850 which is a copy product using the control device 801 of the conventional electronic apparatus 860 shown in FIG. 8 is described with reference to the flowchart of FIG. 9.

The semiconductor storage device 850 does not have a security function, or the semiconductor storage device 850 has a security function but the security function is not used. Accordingly, a memory content stored in any address can always be read out. That is, at Step 1, the control device 801 can freely read all of the memory contents from the semiconductor storage device 850. At Step 2, the control device 801 performs a deactivation operation for the security function. However, as described above, since the semiconductor storage device 850 does not have a security function, or a security function of the semiconductor storage device 850 is inactive, at and after Step 2, the control device 801 can still freely read all of the memory contents from the semiconductor storage device 850 so long as the deactivation operation of the control device 801 does not modify the memory contents of the semiconductor storage device 850.

In this example, at Step 2, the control device 801 merely reads a memory content from address "ADD1", and the memory contents of the semiconductor storage device 850 are left unmodified. Therefore, at and after Step 3, the control device 801 can freely read a memory content stored in any address of the semiconductor storage device 850.

In the control operation (FIG. 9) of the conventional electronic apparatus 860 of FIG. 8, the control device 801 controls the semiconductor storage device 850, which is a copy product of the semiconductor storage device 750, in the same manner as when controlling the semiconductor storage device 750. Thus, the control device 801 cannot hinder the use of a copy product.

Figure 10:
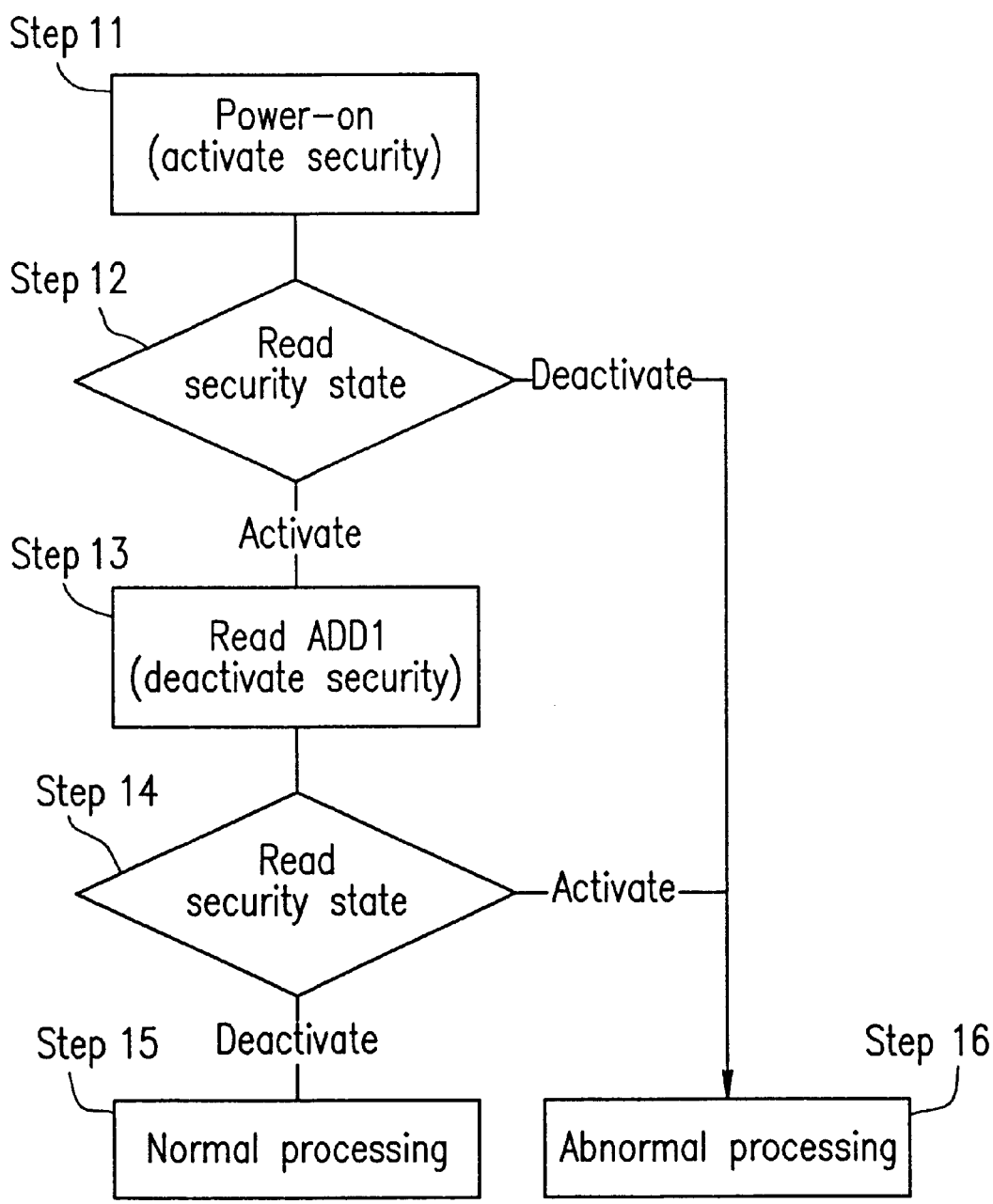
FIG. 10 is a flowchart showing an example of a control operation of a control device shown in FIG. 7.

In the electronic apparatus 760 shown in FIG. 7 according to embodiment 8 of the present invention, the control device 701 performs a control operation shown in a flowchart of FIG. 10. In the flowchart of FIG. 10, only process steps for the security function are shown, and other process steps in the control device 701 are omitted. As described above, a condition for activating the security function of the semiconductor storage device 750 is power-on, and a condition for deactivating the security function is reading data from a specific address "ADD1". The semiconductor storage device 750 includes the security state output section 715 (FIG. 7) for outputting a signal indicating that the security function is in an active or inactive state.

First, a case where the control device 701 controls the authentic semiconductor storage device 750 is described with reference to the flowchart of FIG. 10. At Step 11, the control device 701 activates the security function of the semiconductor storage device 750. Accordingly, after Step 11, a portion of the operations of the semiconductor storage device 750 is restricted. Then, at Step 12, the control device 701 confirms, using the security circuit 706 in the semiconductor storage device 750, whether the security function of the semiconductor storage device 750 is active or inactive. Since the security function of the semiconductor storage device 750 has been activated at Step 11, and a deactivation operation for the security function has not yet been performed, the semiconductor storage device 750 outputs to the control device 701 a signal indicating that the security function is active. In response to this signal, the control device 701 proceeds to Step 13.

At Step 13, when data is read from address "ADD1", the security function of the semiconductor storage device 750 is deactivated.

At Step 14, the control device 701 again confirms the state of the security function of the semiconductor storage device 750. Since the security function has been deactivated at Step 13, the semiconductor storage device 750 outputs to the control device 701 a signal indicating that the security function is inactive. In response to this signal, the control device 701 proceeds to Step 15 to perform normal operation.

Next, a control operation of the control device 701 for controlling the semiconductor storage device 850, which is a copy product of the semiconductor storage device 750, is described with reference to the flowchart of FIG. 10.

In this example, the semiconductor storage device 850 does not have a security function, or the semiconductor storage device 850 has a security function but the security function is not used. Furthermore, when the control device 701 requests the semiconductor storage device 850 to output the state of the security function, the semiconductor storage device 850 always outputs a constant output value.

At Step 11, the condition for activating the security function of the semiconductor storage device 750 is satisfied. However, as described above, since the semiconductor storage device 850 does not have a security function, or the security function is not used, operation of the semiconductor storage device 850 is never restricted.

At Step 12, when an operation for reading the state of the security function is performed, the semiconductor storage device 850 outputs the constant output value to the control device 701. When the control device 701 determines that the output value from the semiconductor storage device 850 indicates the security function being in an inactive state, the control device 701 proceeds to Step 16 to perform abnormal processing. On the other hand, when the control device 701 determines that the output value from the semiconductor storage device 850 indicates the security function being in an active state, the control device 701 proceeds to Step 13.

When the control device 701 determines that the security function of the semiconductor storage device 850 is inactive, and proceeds to Step 16, either "the output value from the semiconductor storage device 850 is different from an output value of the semiconductor storage device 750" or "the security function of the semiconductor storage device 750 is inactive". In either case, it is possible to determine that the fraudulent semiconductor storage device 850 is used in place of the authentic semiconductor storage device 750. As a result, the control device 701 performs abnormal processing.

On the other hand, when the control device 701 determines that the output value from the semiconductor storage device 850 indicates the security function being in an active state, the control device 701 proceeds to Step 13, and reads a memory content in address "ADD1". When the semiconductor storage device 750 is used, this reading operation satisfies the condition for deactivating the security function of the semiconductor storage device 750. However, when the semiconductor storage device 850 is used, this reading operation is merely a common reading operation. When the memory content in address "ADD1" has been read out, the control device 701 proceeds to Step 14, and requests a signal indicating the state of the security function.

In this case, when receiving a signal indicating that the security function is inactive, the control device 701 proceeds to Step 15 to perform normal processing. On the other hand, when receiving a signal indicating that the security function is active, the control device 701 proceeds to Step 16 to perform abnormal processing.

At each of Steps 12 and 14, an operation for reading the state of the security function is performed. In the case where the semiconductor storage device 850 is used, when the control device 701 determines at Step 12 that the security function is active, the control device 701 will also determine at Step 14 that the security function is active. In this case, although reading of data from address "ADD1", which is the condition for deactivating the security function, has been performed, the control device 701 determines that the security function is active. As a result, the control device 701 proceeds to Step 16 to perform abnormal processing.

In the above description, the semiconductor storage device 850 does not have a security function, or the semiconductor storage device 850 has a security function but the security function is not used. However, even in the case where the semiconductor storage device 850 has a security function and the security function is used, use of a fraudulent product can be prevented except when the copy semiconductor storage device 850 uses the same condition for activating/deactivating the security function as the authentic semiconductor storage device 750.

As described hereinabove, when the control device 701 controls the semiconductor storage device 850 which is a fraudulent article, the control device 701 operates according to the control operation shown in the flowchart of FIG. 10, and as a result, performs the abnormal processing. Thus, the fraudulent semiconductor storage device 850 cannot be used in place of the semiconductor storage device 750. Only when a fraudulent semiconductor storage device 850 has the same security state output section as that of the semiconductor storage device 750 and has the same conditions for activating and deactivating the security function as those of the semiconductor storage device 750, can the fraudulent semiconductor storage device 850 be used in place of the authentic semiconductor storage device 750. Thus, even when data read from the semiconductor storage device 750 is copied into a general-purpose semiconductor storage device, such a semiconductor storage device cannot be used in the electric apparatus of the present invention.

In the flowchart shown in FIG. 10, restriction on a reading operation by the security function can be utilized in place of the state of the security function. A control operation in such a case is described with reference to a flowchart shown in FIG. 11.

The semiconductor storage device 750 stores data "VAL1" in address "ADD2". While a security function is active, reading of data from address "ADD2" is restricted, and in case of reading from address "ADD2", dummy data "VAL2" is output in place of "VAL1".

First, a control operation in the case where the control device 701 controls the semiconductor storage device 750 is described with reference to the flowchart shown in FIG. 11.

At Step 21, since the condition for activating the security function of the semiconductor storage device 750 is satisfied, the control device 701 proceeds to Step 22. At Step 22, the control device 701 performs a reading operation for address "ADD2". At this time, since the security function is active, the dummy data "VAL2" is read from address "ADD2", and the dummy data "VAL2" is output from the semiconductor storage device 750 to the control device 701.

When the dummy data "VAL2" is read out, the security function is deactivated at Step 23, and as a result, the memory contents stored in the semiconductor storage device 750 can be freely read out. In this state, at Step 24, the control device 701 again performs a reading operation for address "ADD2". At this time, since the security function is inactive, the correct data "VAL1" is read from address "ADD2", and the data "VAL1" is output from the semiconductor storage device 750 to the control device 701. In this way, the correct data "VAL1" is read out, and the control device 701 proceeds to Step 25 to perform normal operation.

Next, a control operation in the case where the control device 701 controls a semiconductor storage device 850, which is a copy of the semiconductor storage device 750, is described with reference to the flowchart shown in FIG. 11.

At Step 21, the control device 701 performs an operation for activating the security function, but this operation does not effect the semiconductor storage device 850 which does not have a security function, or the semiconductor storage device 850 which has a security function but the security function is not used. Accordingly, at Step 22, the correct data "VAL1" is normally read from address "ADD2". Thus, when the correct data "VAL1" is read out while the control device 701 has determined that the security function is active, the control device 701 determines that this reading operation is abnormal, and proceeds to Step 26 to perform abnormal processing.

Figure 11:
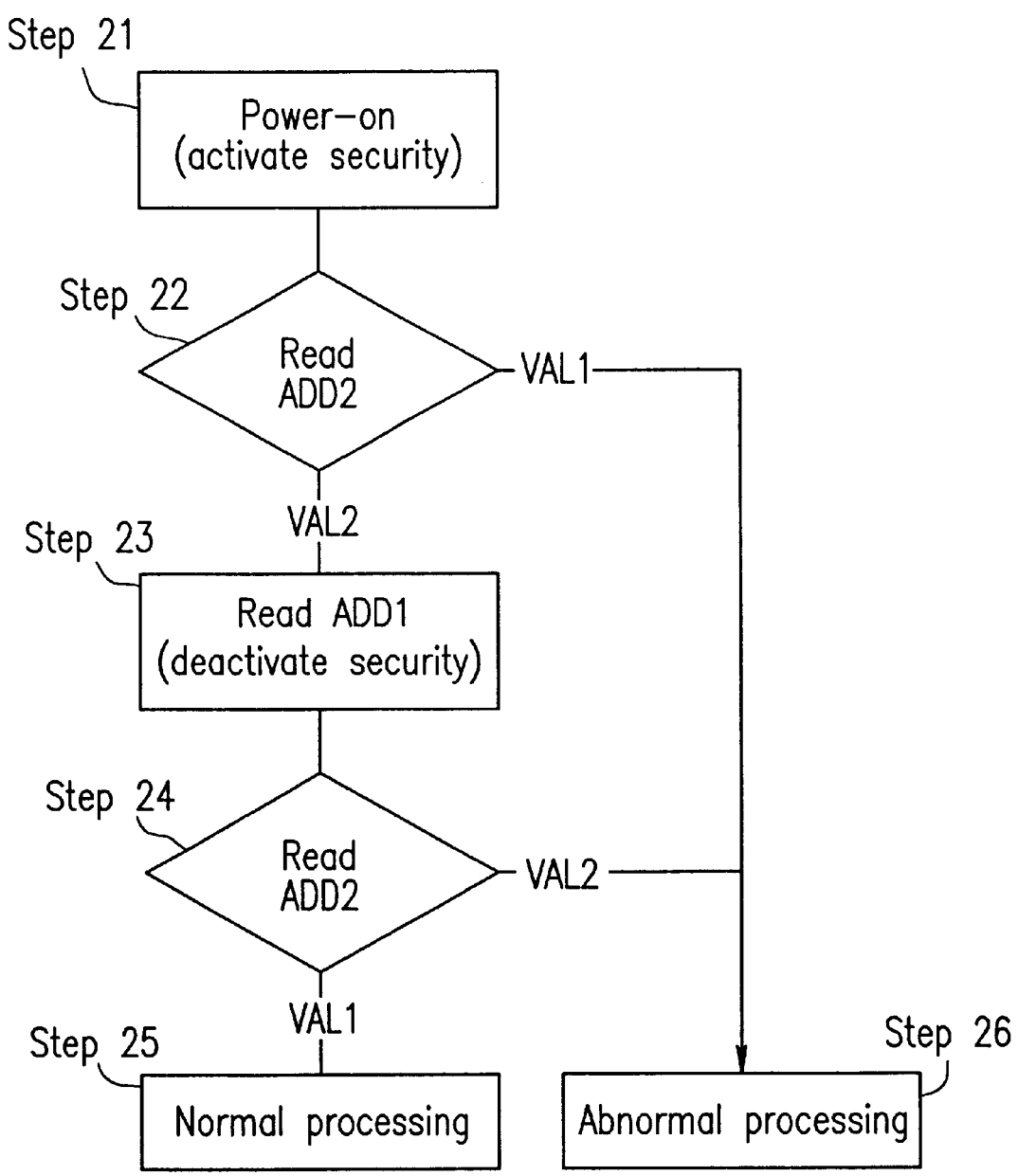
FIG. 11 is a flowchart showing another example of a control operation of the control device shown in FIG. 7.

In this example, the control device 701 operates according to the control operation shown in the flowchart of FIG. 11, whereby an electronic apparatus which does not normally operate when a fraudulent semiconductor storage device is used therewith is obtained.

However, when the flowchart of FIG. 11 is employed, the dummy data "VAL2" must be different from the correct data "VAL1". Therefore, in order to appropriately select the dummy data "VAL2" of address "ADD2", the semiconductor storage device 750 is required to store data used for control beforehand.

Thus, the control shown in the flowchart of FIG. 11 is limited with respect to the use of data, although it is advantageous as compared to the control shown in the flowchart of FIG. 12 (described later) because it is not necessary to provide in the semiconductor storage device 750 means for informing the control device 701 about the state of the security function.

In the above example, power-on is used as a condition for activating the security function, and reading of data from a specific address is used as a condition for deactivating the security function. However, according to embodiment 8, the present invention is applicable to any other condition for activating/deactivating the security function.

Figure 12:
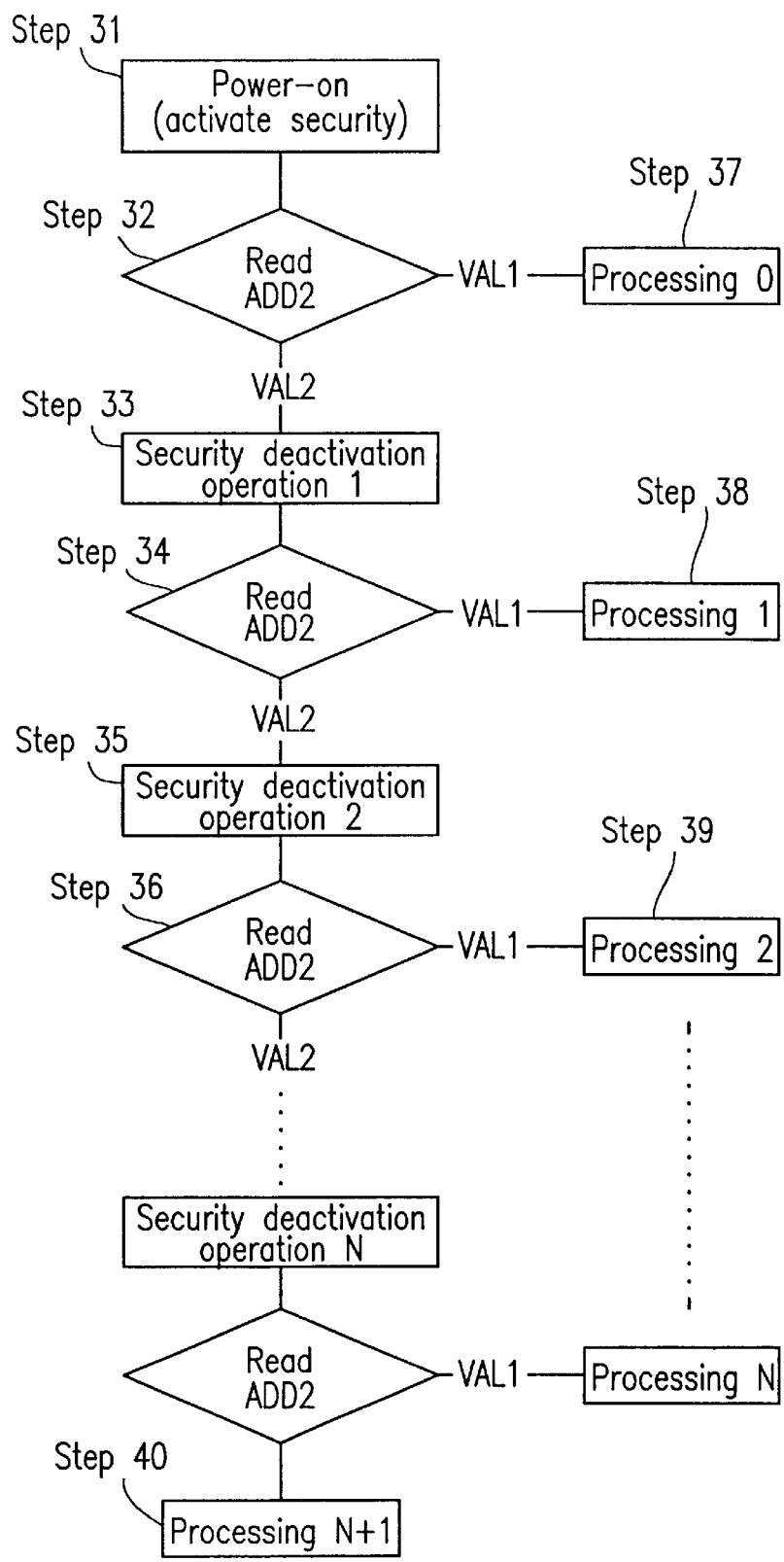
FIG. 12 is a flowchart showing still another example of a control operation of the control device shown in FIG. 7.

FIG. 12 is a flowchart for illustrating a control operation of the control device 701 in the case where the semiconductor storage device 750 has a plurality of conditions for deactivating the security function.

Referring to FIG. 12, at Step 31, the security function of the semiconductor storage device 750 is activated at power-on. At Step 32, the control device 701 performs a reading operation from address "ADD2" for confirming whether or not the security function has been deactivated. In this case, if the data read is correct data "VAL1", the control device

701 determines that the security function has not been activated, and then proceeds to Step 37 to perform processing 0. The processing 0 is to be performed when the security function of the semiconductor storage device 750 has not been activated at power-on. A content of the processing 0 can be optionally determined by a program designer.

At Step 32, in case of reading data from address "ADD2", if the control device 701 obtains dummy data "VAL2", the control device 701 proceeds to Step 33 to perform security deactivation operation 1 which is one of the candidate conditions for deactivating the security function. If the security function is successfully deactivated with the security deactivation operation 1, the control device 701 proceeds to Step 34 to read data from address "ADD2". When the correct data "VAL1" is read out at Step 34, the control device 701 proceeds to Step 38 to perform processing 1. The processing 1 is to be performed when the security function of the semiconductor storage device 750 has been activated at power-on and the security function is deactivated by the security deactivation operation 1. The content of the processing 1 can be optionally determined by a program designer.

In the same manner, security deactivation operations 2 to N are sequentially performed, and different processing is performed for each of the conditions for deactivating the security function of the semiconductor storage device 750. When the security function is not deactivated by any of the security deactivation operations 1 to N, processing (N+1) is performed at Step 40. The content of each of processings 2 to (N+1) can be optionally determined by a program designer.

In this example, data in address "ADD2" is utilized for determining whether or not the security function has been deactivated. However, in the case where the semiconductor storage device 750 includes a security state output section, in place of reading data from address "ADD2", reading of the security state of the semiconductor storage device 750 may be utilized, and a process may be branched according to the read security state. In such a state, it is not necessary to store predetermined data "VAL1" into address "ADD2".

Some or all of processings 0 to (N+1) may be the same processing. In such a case, i.e., in the case where one processing is repeatedly performed, determination and branching are performed after some security deactivation operations have been performed in succession, whereby the entire process can be simplified.

In the above example according to embodiment 8, the process is branched according to the state of a security function of a semiconductor storage device, and different processing is performed. However, the above example is merely an example of the present invention, and the present invention is not limited to the above example so long as processing performed according to the state of a security function causes any other processing. For example, data read out at Step 34 (FIG. 12) may be used in any operation, and the operation may produce a different result according to whether or not the security function has been deactivated by security deactivation operation 1.

According to embodiment 8, an electronic apparatus capable of preventing use of a fraudulent semiconductor storage device which has been produced by copying (counterfeiting) data stored in an authentic semiconductor storage device is achieved so long as the fraudulent semiconductor storage device does not have a security function, the fraudulent semiconductor storage device has a security function but does not use the security function, or the fraudulent semiconductor storage device has different conditions for activating/deactivating a security function from those of the authentic semiconductor storage device.

As described hereinabove, a semiconductor storage device and a control device according to the present invention use a specific address (key-address) for controlling a security function of the semiconductor storage device. In such a structure, it is difficult to distinguish an operation for activating/deactivating the security function from a normal addressing operation. Therefore, it is extremely difficult to fraudulently access a memory space protected by the security function. As a result, the security function for protecting stored data is improved, whereby fraudulent or irregular reading/writing/copying can be surely prevented.

An electronic apparatus of the present invention can prevent use of a semiconductor storage device which has been produced by fraudulently copying (counterfeiting) data stored in an authentic semiconductor storage device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor storage device, comprising:
    a memory having a memory space, a plurality of addressee of the memory space each having data stored therein; and
    a security circuit for controlling a security function which activates or deactivates at least a part of the memory space according to whether, in the case where an address of the memory space input to the security circuit matches at least one key-address included in the security circuit, data stored in the address in the memory space is manipulated under a condition equal to a predetermined condition or under a condition not equal to the predetermined condition, wherein
    a plurality of addresses are input to the security circuit, the security circuit including a plurality of key-addresses set in a predetermined order, and
    the predetermined condition is that the predetermined order of the key-addresses is equal to an order of manipulation for data stored in addresses among the plurality of addresses which match the key-addresses.

2. A semiconductor storage device according to claim 1, wherein, when data in an address among the plurality of addresses which does not match any of the key-addresses is manipulated, the security circuit does not determine whether or not an manipulation order for the address which does not match any of the key-addresses is consistent with a predetermined order of the key-addresses.

3. A semiconductor storage device according to claim 1, wherein, when the order of manipulation for data stored in the plurality of addresses does not match the predetermined order of the key-addresses, the security circuit cancels a previously determined match between the predetermined order of the key-addresses and an order of the plurality of addresses.

4. A semiconductor storage device according to claim 1, wherein, when the order of manipulation for data stored in the plurality of addresses matches the predetermined order of the key-addresses except that data in one of the addresses matched with any of the key-addresses is repetitively manipulated, the security circuit determines that these orders match each other.

5. A semiconductor storage device according to claim 1, wherein a match determination between the address and the key-address is performed only with respect to a portion of the address.

6. A semiconductor storage device according to claim 1, wherein some or all of the key-addresses are rewritable.

7. A semiconductor storage device according to claim 1, wherein the at least one key-address is stored in the memory.

8. A semiconductor storage device according to claim 1, wherein:
the at least one key-address is stored in the memory; and
the memory has a redundant memory structure including at least one address for storing the key-address.

9. A semiconductor storage device according to claim 1, wherein:
the at least one key-address is stored in the memory;
the memory has a redundant memory structure including at least one address for storing the key-address; and
an address in the memory for storing data of one of the key-addresses can be used for storing data of an address in the memory which is different from the key address.

10. A semiconductor storage device according to claim 1, wherein the predetermined condition is changed when the predetermined condition is satisfied.

11. A semiconductor storage device according to claim 1, wherein addresses in the memory space to be activated/deactivated are changed when the predetermined condition is satisfied.

12. A semiconductor storage device according to claim 1, wherein the security circuit includes a security state output section for outputting a signal indicating a state of a security function.

13. A control device for controlling a semiconductor storage device having a memory space, in which a security function of the semiconductor storage device is controlled such that at least a part of the memory space is activated/deactivated,
wherein the security function of the semiconductor storage device is controlled according to whether, in the case where an address of the memory space input from the control device matches at least one key-address stored in the semiconductor storage device, data stored in the address in the memory pace of the semiconductor storage device is manipulated under a condition equal to a predetermined condition or under a condition not equal to the predetermined condition, wherein
the control device inputs a plurality of addresses into the semiconductor storage device, the semiconductor storage device having a plurality of key-addresses set in a predetermined order, and
the predetermined condition is that the predetermined order of the key-addresses is equal to an order of manipulation for data stored in addresses among the plurality of addresses which match the key-addresses.

14. A control device according to claim 13, wherein, when data in an address among the plurality of addresses which does not match any of the key-addresses is manipulated, the semiconductor storage device does not determine whether or not an manipulation order for the address which does not match any of the key-addresses is consistent with a predetermined order of the key-addresses.

15. A control device according to claim 13, wherein, when the order of manipulation for data stored in the plurality of addresses does not match the predetermined order of the key-addresses, the semiconductor storage device cancels a previously determined match between the predetermined order of the key-addresses and an order of the plurality of addresses.

16. A control device according to claim 13, wherein, when the order of manipulation for data stored in the plurality of addresses matches the predetermined order of the key-addresses except that data in one of the addresses matched with any of the key-addresses is repetitively manipulated, the semiconductor storage device determines that these orders match each other.

17. A control device according to claim 13, wherein a match determination between the address and the key-address is performed only with respect to part of the address.

18. A control device according to claim 13, wherein some or all of the key-addresses are rewritable.

19. A control device according to claim 13, wherein the predetermined condition is changed when the predetermined condition is satisfied.

20. A control device according to claim 13, wherein addresses in the memory space to be activated/deactivated are changed when the predetermined condition is satisfied.

21. An electronic apparatus, comprising:
a semiconductor storage device having a memory space and a security circuit connected to the memory space; and
a control device connected to the security circuit for controlling a security function which activates/deactivates at least a part of the memory space,
wherein the control device reads a state of the security function of the semiconductor storage device after the security function of the storage device has been controlled, and
wherein:
the semiconductor storage device outputs authentic data when data is output from an active memory space; and
in response to the dummy data from the semiconductor storage device, the control device deactivates the security function of the storage device.

22. An electronic apparatus according to claim 21, wherein the security function of the semiconductor storage device is deactivated by satisfying a plurality of conditions.

* * * * *

UNITED STATES PATENT AND TRADEMARK OFFICE
CERTIFICATE OF CORRECTION

| | |
|---|---|
| PATENT NO. | : 6,751,716 B2 |
| APPLICATION NO. | : 09/834519 |
| DATED | : June 15, 2004 |
| INVENTOR(S) | : Ken Sumitani et al. |

It is certified that error appears in the above-identified patent and that said Letters Patent is hereby corrected as shown below:

On the Title page, in the title, item (54) and col. 1:

Delete "SEMICONDUCTOR STORAGE DEVICE, CONTROL DEVICE, AND ELECTRONIC APPARATUS" and replace with -- SEMICONDUCTOR STORAGE DEVICE WITH IMPROVED SECURITY CIRCUIT, CONTROL DEVICE AND ELECTRONIC APPARATUS USING THE SAME --

Signed and Sealed this
Twentieth Day of November, 2012

David J. Kappos
*Director of the United States Patent and Trademark Office*